(12) United States Patent
Sendai

(10) Patent No.: US 9,542,958 B2
(45) Date of Patent: Jan. 10, 2017

(54) DISPLAY DEVICE, HEAD-MOUNT TYPE DISPLAY DEVICE, METHOD OF CONTROLLING DISPLAY DEVICE, AND METHOD OF CONTROLLING HEAD-MOUNT TYPE DISPLAY DEVICE

(71) Applicant: Seiko Epson Corporation, Tokyo (JP)

(72) Inventor: Kaori Sendai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 14/100,421

(22) Filed: Dec. 9, 2013

(65) Prior Publication Data
US 2014/0172432 A1 Jun. 19, 2014

(30) Foreign Application Priority Data

Dec. 18, 2012 (JP) .................................. 2012-275338
Oct. 4, 2013 (JP) .................................. 2013-208872

(51) Int. Cl.
*G10L 21/06* (2013.01)
*G10L 21/10* (2013.01)

(52) U.S. Cl.
CPC ........................................ *G10L 21/10* (2013.01)

(58) Field of Classification Search
CPC .......... G02B 27/017; G02B 2027/014; G02B 27/0093; G06F 3/012; G06F 3/011; G06F 3/013; G06T 15/20; G06T 2207/10028; G06T 7/0022; G06T 7/2053; G09G 3/20; G10L 2021/02166; G10L 21/06
USPC ............ 704/276, 275, 235; 725/81; 381/17; 359/630, 464; 353/69; 348/53; 345/8, 7, 345/156
See application file for complete search history.

(56) References Cited

U.S. PATENT DOCUMENTS

| | | | | |
|---|---|---|---|---|
| 6,011,526 A | * | 1/2000 | Toyoshima | G06F 3/012 345/156 |
| 6,369,952 B1 | * | 4/2002 | Rallison | G02B 27/017 359/630 |
| 7,193,584 B2 | * | 3/2007 | Lee | G02B 7/12 345/7 |
| 8,217,856 B1 | * | 7/2012 | Petrou | G02B 27/017 345/8 |
| 8,886,530 B2 | * | 11/2014 | Nakadai | G10L 21/06 704/231 |

(Continued)

FOREIGN PATENT DOCUMENTS

| | | |
|---|---|---|
| JP | 2007-256915 A | 10/2007 |
| JP | 2007-334149 A | 12/2007 |

(Continued)

*Primary Examiner* — Michael Colucci
(74) *Attorney, Agent, or Firm* — ALG Intellectual Property, LLC

(57) ABSTRACT

A transmissive display device includes an image display section adapted to generate image light representing an image, allow a user to visually recognize the image light, and transmit an external sight, a sound acquisition section adapted to obtain a sound, a conversion section adapted to convert the sound into a character image expressing the sound as an image using characters, a specific direction setting section adapted to set a specific direction, and a display position setting section adapted to set an image display position, which is a position where character image light representing the character image is made to be visually recognized in a visual field of the user, based on the specific direction.

31 Claims, 17 Drawing Sheets

(56) References Cited

U.S. PATENT DOCUMENTS

| | | | |
|---|---|---|---|
| 2004/0223219 A1* | 11/2004 | Tooyama | G02B 27/2207 359/464 |
| 2007/0195012 A1 | 8/2007 | Ichikawa et al. | |
| 2010/0079356 A1* | 4/2010 | Hoellwarth | G02B 27/017 345/8 |
| 2010/0097580 A1* | 4/2010 | Yamamoto | G02B 26/101 353/69 |
| 2010/0290124 A1* | 11/2010 | Tohara | G02B 27/0172 359/630 |
| 2012/0162259 A1 | 6/2012 | Sakai | |
| 2012/0243689 A1* | 9/2012 | Jeong | G06T 7/2053 381/17 |
| 2013/0018659 A1* | 1/2013 | Chi | G06F 17/30401 704/275 |
| 2013/0174205 A1* | 7/2013 | Jacobsen | H04N 21/43637 725/81 |
| 2015/0168716 A1* | 6/2015 | Gotoda | G02B 27/01 345/156 |

FOREIGN PATENT DOCUMENTS

| | | |
|---|---|---|
| JP | 2011-192048 A | 9/2011 |
| JP | 2012-133250 A | 7/2012 |

\* cited by examiner

DISPLAY DEVICE, HEAD-MOUNT TYPE DISPLAY DEVICE, METHOD OF CONTROLLING DISPLAY DEVICE, AND METHOD OF CONTROLLING HEAD-MOUNT TYPE DISPLAY DEVICE

BACKGROUND

1. Technical Field

The present invention relates to a display device.

2. Related Art

A head-mount type display device (a head mounted display (HMD)) as a display device to be mounted on the head has been known. The head-mount type display device generates image light representing an image using, for example, a liquid crystal display and a light source, and then guides the image light thus generated to the eyes of the user using a projection optical system and a light guide plate to thereby make the user visually recognize a virtual image. The head-mount type display device includes two types, namely a transmissive type with which the user can visually recognize the external sight in addition to the virtual image, and a non-transmissive type with which the user is not allowed to visually recognize the external sight. The transmissive head-mount type display device includes an optical transmissive type and a video transmissive type.

In the transmissive head-mount type display device, there has been known a technology of converting a voice into a character image representing the voice, and then making the user visually recognize the voice. In JP-A-2007-334149 (Document 1), for example, there is disclosed a technology of making the user visually recognize a variety of voices obtained by an attached microphone as a character image in the head-mount type display device for a hearing-impaired person.

However, in the technology described in Document 1, although the user can visually recognize the character image representing the voice in the head-mount type display device, since the position at which the virtual image is formed is fixed in the visual field of the user in order to make the user visually recognize the character image, there is a possibility that the character image hinders the visual field of the user. Further, there is a problem that the relationship between a sound source and the character image representing the voice obtained from the sound source is not at all considered. Further, there is a problem that it is necessary to distinguish a plurality of types of voices obtained from a plurality of sound sources from each other. It should be noted that the problems described above are related not only to the head-mount type display device, but also to display devices in common.

SUMMARY

An advantage of some aspects of the invention is to solve at least a part of the problems described above, and the invention can be implemented as the following aspects.

(1) An aspect of the invention provides a transmissive display device. The display device includes an image display section adapted to generate image light representing an image, allow a user to visually recognize the image light, and transmit an external sight, a sound acquisition section adapted to obtain a sound, a conversion section adapted to convert the sound into a character image expressing the sound as an image using characters, a specific direction setting section adapted to set a specific direction, and a display position setting section adapted to set an image display position, which is a position where character image light representing the character image is made to be visually recognized in a visual field of the user, based on the specific direction. According to the display device of this aspect of the invention, it is possible to make the user visually recognize the voice obtained as the character image representing the sound based on the specific direction set by the user, and thus, the degree of understanding of the user in recognizing the sound can be improved. Further, since the image display position of the character image representing the sound obtained in the visual field of the user is set based on the specific direction set by the user, the user can visually recognize the specific direction thus set and the character image so as to be associated with each other, and it is easy to recognize the relationship between the specific direction thus set and the character image, and thus the convenience for the user is enhanced.

(2) The display device according to the aspect of the invention described above may be configured such that the display position setting section sets the image display position so as not to overlap a position corresponding to the specific direction in the visual field of the user. According to the display device of this aspect of the invention, it is easy for the user to recognize the sound source and the character image representing the sound obtained from the sound source so as to be associated with each other.

(3) The display device according to the aspect of the invention described above may be configured such that the display position setting section sets the image display position to a position corresponding to a part other than a center in the visual field of the user. According to the display device of this aspect of the invention, the user can visually recognize the character image representing the sound while visually recognizing the external sight at the center of the visual field.

(4) The display device according to the aspect of the invention described above may be configured such that the sound acquisition section has sensitivity of obtaining a sound, the sensitivity varying with a direction from a sound source to the sound acquisition section, and the specific direction is set based on the sensitivity to the sound obtained. According to the display device of this aspect of the invention, since the user is made to visually recognize the character image representing the sound with the highest sound volume level, it is possible to make the user recognize the external sound, which the user should pay the greatest attention to, as the visual information even in the case in which it is difficult for the user to hear the external sound.

(5) The display device according to the aspect of the invention described above may be configured such that the specific direction is a direction from the sound acquisition section to the sound source. According to the display device of this aspect of the invention, it is possible to make the sound obtained from the sound source be visually recognized by the user so as to be associated with the sound source, and the degree of understanding of the sound thus obtained for the user is enhanced.

(6) The display device according to the aspect of the invention described above may be configured such that the display device further includes an image acquisition section adapted to obtain an image of the external sight at a plurality of time points, and the image display position setting section sets the image display position based on a variation in the image of the external sight at the plurality of time points and the specific direction. According to the display device of this aspect of the invention, since the sound source direction is recognized by the user in a more detailed manner, and the position where the character image is visually recognized by the user is set in the vicinity of the sound source direction, it is easy to make the user visually recognize the sound source direction and the character image representing the sound generated by the target sound source so as to more strongly be associated with each other.

(7) The display device according to the aspect of the invention described above may be configured such that the display device further includes a distance identification section adapted to identify a distance from the display device to the sound source, and the display position setting section performs at least one of change in size of the character image light and setting of the image display device based on the distance identified. According to the display device of this aspect of the invention, since at least one of the change in size of the character image and the setting of the image display position is performed in accordance with the distance from the user to the target sound source, it is possible to make the user recognize the distance to the target sound source as the visual information.

(8) The display device according to the aspect of the invention described above may be configured such that the display device further includes a distance identification section adapted to identify a distance from the display device to the sound source, and the conversion section changes a type of the character image based on the distance identified. According to the display device of this aspect of the invention, since the type of the character image to be made to be visually recognized by the user varies in accordance with the distance from the user to the target sound source, it is possible to make the user recognize the distance to the target sound source as the visual information.

(9) The display device according to the aspect of the invention described above may be configured such that the sound acquisition section has sensitivity of obtaining a volume of a sound, the sensitivity varying with a direction from a sound source to the sound acquisition section, and the display position setting section sets the image display position based on the volumes of the sound generated by the same sound source and differently obtained in respective directions different from each other. According to the display device of this aspect of the invention, since it is possible to set the sound source direction and to make the character image obtained in the vicinity of the target sound source be visually recognized by the user without taking the external sight image, convenience for the user is enhanced.

(10) The display device according to the aspect of the invention described above may be configured such that the sound acquisition section has sensitivity of obtaining a sound, the sensitivity varying with a direction from the sound source to the sound acquisition section, and is oriented so that the sensitivity of obtaining the sound from the specific direction becomes the highest. According to the display device of this aspect of the invention, the sound acquisition section obtains the sound from the specific direction with high sensitivity, and since the larger the shift from the specific direction is, the more difficult it becomes to obtain the sound, the accuracy of the sound obtained from the specific direction is improved.

(11) The display device according to the aspect of the invention described above may be configured such that there are further included a sound identification section adapted to distribute the sounds into types of the sounds, the sounds being obtained from a plurality of sound sources, and having the respective types different from each other, and an operation section adapted to receive an operation by the user, the specific direction setting section identifies a specific sound source direction, which is a direction from the sound acquisition section to the sound source from which one of the plurality of sounds is obtained based on the operation, and the display position setting section sets a position, where the image light representing the one sound is made to be recognized, to a position corresponding to the specific sound source direction in a visual field of the user. According to the display device of this aspect of the invention, even in the case of a conversation including more than one person, the character image representing the sound obtained from the specific sound source direction is visually recognized at a position adjacent to the specific sound source direction in the visual field VR of the user. Therefore, the user can recognize the specific sound source direction and the character image representing the sound obtained from the specific sound source direction so as to be associated with each other with the sense of vision in addition to the sense of hearing, and thus, easily understands the content of the conversation.

(12) The display device according to the aspect of the invention described above may be configured such that the display position setting section sets a position, where the character image light representing the one sound is made to be recognized, to a position failing to overlap any of positions corresponding respectively to the plurality of specific sound source directions in a visual field of the user. According to the display device of this aspect of the invention, since the either of the character images respectively representing the sounds obtained from the plurality of specific sound source directions is visually recognized at a position not overlapping any of the plurality of sound source directions, it is possible for the user to visually recognize the specific sound source directions and the character images respectively representing the sounds obtained from the specific sound source directions so as to more strongly be associated with each other.

(13) The display device according to the aspect of the invention described above may be configured such that the image display section converts the plurality of sounds into the image lights different from each other by the type of the sound, and allows the user to recognize the image light of each of the types of the plurality of sounds as a virtual image, and the operation corresponds to an operation of specifying the image light corresponding to the sound from the one specific sound source direction from the image lights of the respective types of the plurality of sounds recognized in the visual field of the user. According to the display device of this aspect of the invention, the user can easily set the specific sound source direction and the character image representing the sound obtained from the specific sound source direction by a simple and convenient operation.

(14) The display device according to the aspect of the invention described above may be configured such that the image display section allows the user to recognize the image light as a virtual image with a predetermined time delay from a time point when the sound acquisition section obtains the sound. According to the display device of this aspect of the invention, in the case of temporarily failing to hear the sound and missing the character image representing the sound, the degree of understanding of the user on the context of the sound thus obtained is improved using the character image recognized in the visual field of the user with the time delay from the sound.

(15) The display device according to the aspect of the invention described above may be configured such that the display device further includes an eye direction estimation section adapted to estimate an eye direction of the user, the image display section allows the user to visually recognize the image light in a state of being worn on the head of the user, and the display position setting section sets the image display position based on a relationship between the specific direction and the eye direction. According to the display device of this aspect of the invention, since whether or not the specific direction is visually recognized in the visual field of the user is determined in accordance with the difference between the specific direction and the eye direction, it is easy to recognize the specific direction and the character image representing the sound thus obtained so as to be associated with each other.

(16) The display device according to the aspect of the invention described above may be configured such that the display position setting section sets the image display position to a vicinity of the position corresponding to the specific direction in the visual field of the user in a case in which the a specific angle, which is an angle formed between the eye direction and the specific direction, is smaller than a first threshold value, and sets the image display position independently of the specific direction in a case in which the specific angle is one of equal to and larger than the first threshold value. According to the display device of this aspect of the invention, in the case in which the specific direction is visually recognized as the external sight in the visual field of the user, since the image display position is set to the vicinity of the specific direction, the degree of understanding of the user with respect to the sound obtained is improved.

(17) The display device according to the aspect of the invention described above may be configured such that the display device further includes an image acquisition section adapted to obtain an image of the external sight, the image display section generates specific direction image light, which is image light representing an image in the specific direction obtained by the image acquisition section, and allows the user to visually recognize the specific direction image light as a virtual image in a case in which a specific angle, which is an angle formed between the eye direction and the specific direction, is one of equal to and larger than a second threshold value, and stops generating the specific direction image light in a case in which the specific angle is smaller than the second threshold value, and the display position setting section sets the position, where the specific direction image light is made to be recognized, in a vicinity of the image display position, and so as to fail to overlap the image display position, in a case in which the specific angle is one of equal to and larger than the second threshold value, and sets the image display position in a vicinity of a position corresponding to the specific direction in a visual field of the user in a case in which the specific angle is smaller than the second threshold value. According to the display device of this aspect of the invention, since the image obtained by taking the image of the specific direction and the image display position are visually recognized in the positions adjacent to each other even in the case in which the specific direction is not visually recognized in the external sight in the visual field of the user, the degree of understanding of the user with respect to the sound obtained is improved.

(18) The display device according to the aspect of the invention described above may be configured such that the display device further includes a sound identification section adapted to distinguish the sound obtained and a specific sound different from the sound obtained from each other, and the conversion section converts the sound obtained and the specific sound into the respective character images different in type from each other. According to the display device of this aspect of the invention, since the character image representing the sound obtained and the character image representing a sound different from the sound obtained are displayed as the character images different in type from each other, it is possible to make the user visually recognize the difference between the sound sources for generating the sounds.

(19) The display device according to the aspect of the invention described above may be configured such that the display device further includes a communication section adapted to obtain a sound signal using communication, and the specific sound is a sound output based on the sound signal obtained by the communication section. According to the display device of this aspect of the invention, it is possible to make the user look and listen not only the external sound obtained, but also the sounds representing a variety of sound signals obtained by the communication, and at the same time, make the user recognize the sound obtained by the communication as the visual information.

(20) Another aspect of the invention provides a transmissive head-mount type display device. The head-mount type display device includes an image display section adapted to generate image light representing an image, allow a user to visually recognize the image light in a state of being worn on a head of the user, and transmit an external sight, a sound acquisition section adapted to obtain a sound, a conversion section adapted to convert the sound into a character image expressing the sound as an image using characters, an eye direction estimation section adapted to estimate an eye direction of the user, and a display position setting section adapted to set an image display position, which is a position where character image light representing the character image is made to be visually recognized in a visual field of the user, based on a variation in the eye direction. Since the head-mount type display device sets the image display position to the position where the image does not hinder the field of view in accordance with the direction of the visual recognition by the user, the usability for the user is enhanced.

(21) The head-mount type display device according to the aspect of the invention described above may be configured such that the sound acquisition section has sensitivity of obtaining a volume of a sound, the sensitivity varying with a direction from a sound source to the sound acquisition section, and the display position setting section sets the image display position based on the volumes of the sound generated by the same sound source and differently obtained in respective directions different from each other. According to the head-mount type display device of this aspect of the invention, since it is possible to set the sound source direction and to make the character image obtained in the vicinity of the target sound source be visually recognized by the user without taking the external sight image, convenience for the user is enhanced.

(22) The head-mount type display device according to the aspect of the invention described above may be configured such that the eye direction estimation section estimates a specific value of at least one of an angular velocity and a variation in angle of the eye direction with reference to a display state in which the character image light is recognized by the user, and the display position setting section sets the image display position at a part other than a central part in the visual field of the user in a case in which the specific value exceeds a predetermined value. According to the head-mount type display device of this aspect of the invention, since the image display position is set to the position where the image does not hinder the field of view in accordance with the variation in direction of the visual recognition by the user, the usability for the user is enhanced.

(23) The head-mount type display device according to the aspect of the invention described above may be configured such that the eye direction estimation section estimates a direction of gravitational force and a horizontal direction perpendicular to the direction of gravitational force, and the display position setting section sets the image display position in the visual field of the user based on the specific value in the display state with respect to the direction of gravitational force and the horizontal direction. According to the head-mount type display device of this aspect of the invention, since the image display position is set to the position where the image does not hinder the field of view in accordance with the variation in direction of the visual recognition by the user with respect to the direction of gravitational force or the horizontal direction, the usability for the user is enhanced.

(24) The head-mount type display device according to the aspect of the invention described above may be configured such that the display position setting section sets the image display position to a part other than a central part in the visual field of the user in a case in which the variation in the angle is one of equal to and larger than a third threshold value, and sets the image display position to a predetermined position in the visual field of the user in a case in which the variation in the angle is smaller than the third threshold value. According to the head-mount type display device of this aspect of the invention, since the image display position is set to the position where the image does not hinder the field of view in accordance with the angular variation in direction of the visual recognition by the user, the usability for the user is enhanced.

(25) The head-mount type display device according to the aspect of the invention described above may be configured such that the display position setting section sets the image display position to the central part in the visual field of the user in a case in which a predetermined time has elapsed in a state in which the variation in the angle is smaller than a fourth threshold value, and sets the image display position to a part other than the central part in the visual field of the user in a case in which the variation in the angle is one of equal to and larger than the fourth threshold value. According to the head-mount type display device of this aspect of the invention, since the image display position is automatically changed to the position where the user can visually recognize the image with ease in the case in which it is determined that the user gives an eye to the character image, which the user is visually recognizing, usability for the user is improved.

(26) The head-mount type display device according to the aspect of the invention described above may be configured such that the display position setting section sets the image display position to a part other than the central part in the visual field of the user in a case in which the angular velocity is one of equal to and higher than a fifth threshold value, and sets the image display position to a predetermined position in the visual field of the user in a case in which the angular velocity is lower than the fifth threshold value. According to the head-mount type display device of this aspect of the invention, since the image display position is set to the position where the image does not hinder the field of view in accordance with the angular velocity in the direction of the visual recognition by the user, the usability for the user is enhanced.

(27) The head-mount type display device according to the aspect of the invention described above may be configured such that the display position setting section sets the image display position to the central part in the visual field of the user in a case in which a predetermined time has elapsed in a state in which the angular velocity is lower than a sixth threshold value, and sets the image display position to apart other than the central part in the visual field of the user in a case in which the angular velocity is one of equal to and higher than the sixth threshold value. According to the head-mount type display device of this aspect of the invention, since the image display position is automatically changed to the position where the user can visually recognize the image with ease in the case in which it is determined that the user gives an eye to the character image, which the user is visually recognizing, usability for the user is improved.

All of the constituents provided to each of the aspects of the invention described above are not necessarily essential, and in order to solve all or a part of the problems described above, or in order to achieve all or a part of the advantages described in the specification, it is possible to arbitrarily make modification, elimination, replacement with another new constituent, partial deletion of restriction content on some of the constituents. Further, in order to solve all or apart of the problems described above, or in order to achieve all or a part of the advantages described in the specification, it is also possible to combine some or all of the technical features included in one of the aspects of the invention with some or all of the technical features included in another of the aspects of the invention to thereby form an independent aspect of the invention.

For example, an aspect of the invention can be realized as a device provided with at least one or all of the five elements, namely the sound acquisition section, the conversion section, the image display section, the specific direction setting section, and the display position setting section. In other words, it is also possible for the sound acquisition section to be included or not to be included in the device. Further, it is also possible for the conversion section to be included or not to be included in the device. Further, it is also possible for the image display section to be included or not to be included in the device. Further, it is also possible for the specific direction setting section to be included or not to be included in the device. Further, it is also possible for the display position setting section to be included or not to be included in the device. It is also possible for the image display section to generate the image light representing the character image, allow a user to visually recognize the image light, and transmit the external sight. It is possible for the sound acquisition section to obtain, for example, a voice. It is also possible for the conversion section to convert the sound into the character image expressing the sound as an image using characters. It is possible for the specific direction setting section to, for example, set a specific direction. It is also possible for the display position setting section to, for example, set the image display position, which is the position where character image light representing the character image is made to be visually recognized in the visual field of the user, based on the specific direction. Such a device can be realized as, for example, a display device, but can also be realized as a device other than the display device. According to such an aspect of the invention, it is possible to solve at least one of a variety of problems such as improvement in operability of the device, enhancement of easiness of the attaching and detaching operation, integration of the device, and enhancement of easiness of manufacturing. Some or all of the technical features of the display device as each of the aspects of the invention can be applied to this device.

The invention can be implemented in various forms other than the display device. The invention can be implemented in the forms such as a head-mount type display device, a method of controlling a display device or ahead-mount type display device, a display system, a head-mount type display system, a computer program for realizing the function of the display system or the head-mount type display system, a recording medium recording the computer program, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
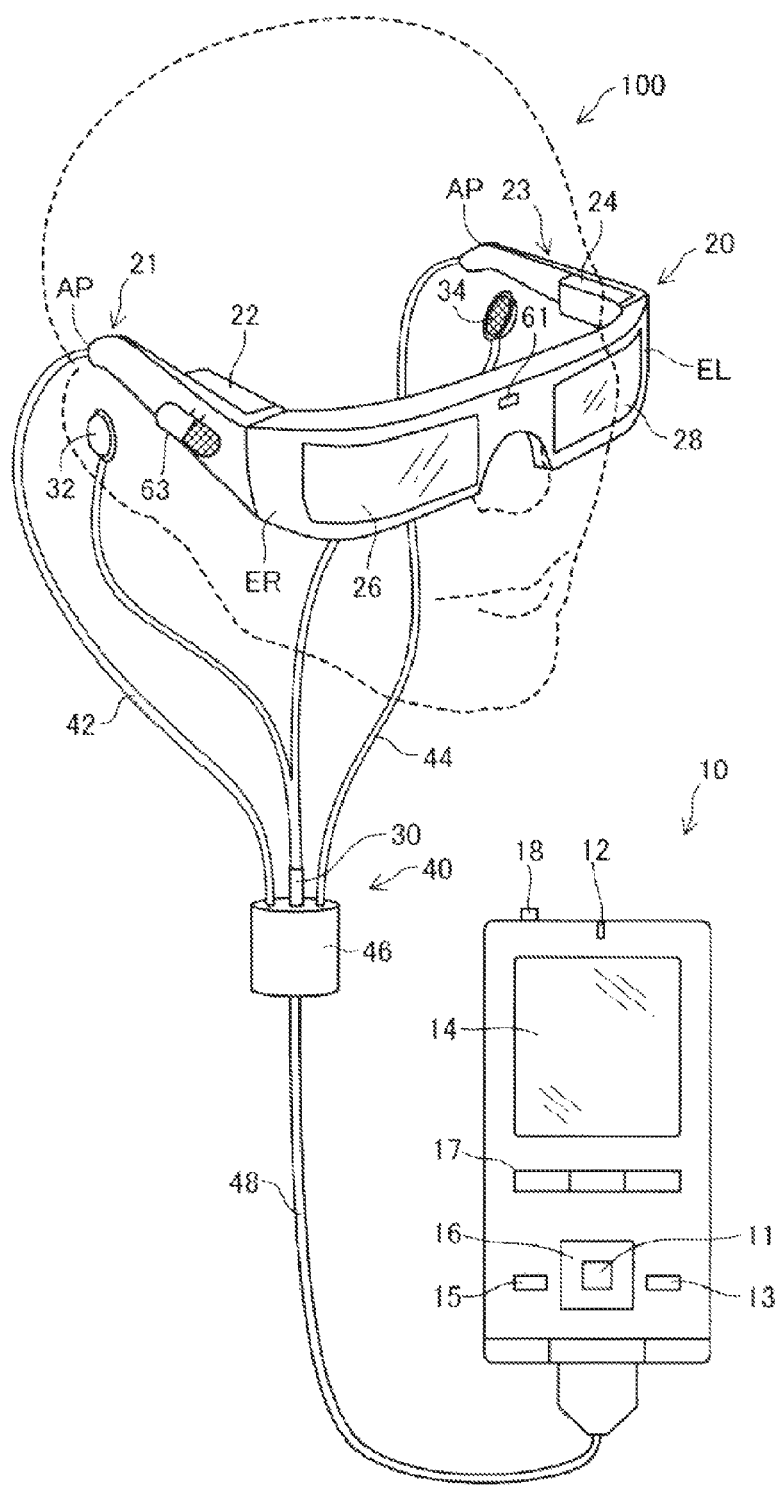
FIG. 1 is an explanatory diagram showing an exterior configuration of a head-mount type display device 100.

Then, some embodiments of the invention will be explained based on specific examples in the following order.
A. First Embodiment
A-1. Configuration of Head Mounted Display
A-2. Image Display Processing of Obtained Voice
B-1. Second Embodiment
B-2. Third Embodiment
C. Modified Examples
A. First Embodiment
A-1. Configuration of Head Mounted Display FIG. 1 is an explanatory diagram showing an exterior configuration of a head-mount type display device 100. The head-mount type display device 100 is a display device to be mounted on the head, and is also called a head mounted display (HMD). The head-mount type display device 100 according to this embodiment is an optical transmissive head-mount type display device allowing the user to visually recognize a virtual image and at the same time visually recognize an external sight directly. It should be noted that in the present specification, the virtual image visually recognized by the user using the head-mount type display device 100 is also referred to as a "display image" for the sake of convenience. Further, emission of the image light generated based on the image data is also referred to as "display of the image."

The head-mount type display device 100 is provided with an image display section 20 for making the user visually recognize the virtual image in the state of being mounted on the head of the user, and a control section 10 (a controller 10) for controlling the image display section 20.

The image display section 20 is a mounting body to be mounted on the head of the user, and has a shape of a pair of glasses in this embodiment. The image display section 20 includes a right holding section 21, a right display drive section 22, a left holding section 23, a left display drive section 24, a right optical image display section 26, a left optical image display section 28, a camera 61, and a microphone 63. The right optical image display section 26 and the left optical image display section 28 are disposed so as to be located in front of the right and left eyes of the user, respectively, when the user wears the image display section 20. One end of the right optical image display section 26 and one end of the left optical image display section 28 are connected to each other at a position corresponding to the glabella of the user when the user wears the image display section 20.

The right holding section 21 is a member disposed so as to extend from an end portion ER, which is the other end of the right optical image display section 26, to a temporal region of the head of the user when the user wears the image display section 20. Similarly, the left holding section 23 is a member disposed so as to extend from an end portion EL, which is the other end of the left optical image display section 28, to a temporal region of the head of the user when the user wears the image display section 20. The right holding section 21 and the left holding section 23 hold the image display section 20 in the head of the user in such a manner as the temples of the pair of glasses.

The right display drive section 22 and the left display drive section 24 are disposed on the sides opposed to the head of the user when the user wears the image display section 20. It should be noted that hereinafter the right holding section 21 and the left holding section 23 are collectively referred to simply as "holding sections," the right display drive section 22 and the left display drive section 24 are collectively referred to simply as "display drive sections," and the right optical image display section and the left optical image display section 28 are collectively referred simply as "optical image display sections."

The display drive sections 22, 24 include liquid crystal displays 241, 242 (hereinafter also referred to as "LCD 241, 242"), projection optical systems 251, 252, and so on (see FIG. 2). The details of the configuration of the display drive sections 22, 24 will be described later. The optical image display sections 26, 28 as optical members include light guide plates 261, 262 (see FIG. 2), and a light control plate. The light guide plates 261, 262 are each formed of a light transmissive resin material or the like, and guide the image light output from the display drive sections 22, 24 to the eyes of the user. The light control plate is a thin-plate like optical element, and is disposed so as to cover the obverse side of the image display section 20, which is the side opposite to the side of the eyes of the user. The light control plate protects the light guide plates 261, 262 to suppress damages, adhesion of dirt, and so on of the light guide plates 261, 262. Further, by controlling the light transmittance of the light control plate, an amount of the outside light entering the eyes of the user is controlled, and thus, the easiness of the visual recognition of the virtual image can be controlled. It should be noted that the light control plate can be eliminated.

The camera 61 is disposed at the position corresponding to the glabella of the user when the user wears the image display section 20. The camera 61 takes the image of the external sight, which is a sight of the outside in the opposite direction to the side of the eyes of the user. The camera 61 in this embodiment is a monocular camera, but can also be a stereo camera. The camera 61 corresponds to an image acquisition section in the appended claims.

The microphone 63 is disposed on the opposite side to the right display drive section 22 in the right holding section 21. The microphone 63 is a directional microphone having the sensitivity in obtaining the voice different by direction. A mechanical structure is formed inside the right holding section 21 to which the microphone 63 is connected, and the microphone 63 can be moved relatively to the right holding section 21.

The image display section 20 further includes a connection section 40 for connecting the image display section 20 to the control section 10. The connection section 40 includes a main body cord 48 to be connected to the control section 10, a right cord 42, a left cord 44, and a connecting member 46. The right cord 42 and the left cord 44 are obtained by branching the main body cord 48 into two cords. The right cord 42 is inserted into the housing of the right holding section 21 from a tip portion AP in the extending direction of the right holding section 21, and is connected to the right display drive section 22. Similarly, the left cord 44 is inserted into the housing of the left holding section 23 from a tip portion AP in the extending direction of the left holding section 23, and is connected to the left display drive section 24. The connecting member 46 is disposed at a branch point of the main body cord 48 and the right cord 42 and the left cord 44, and includes a jack to which a earphone plug 30 is connected. A right earphone 32 and a left earphone 34 extend from the earphone plug 30.

The image display section 20 and the control section 10 perform transmission of various signals via the connection section 40. Connecters (not shown) to be fitted with each other are disposed at an end portion of the main body cord 48 on the opposite side to the connecting member 46, and the control section 10, respectively. The control section 10 and the image display section 20 are connected to each other or separated from each other in accordance with fitting/releasing of the connector of the main body cord 48 and the connector of the control section 10. As the right cord 42, the left cord 44, and the main body cord 48, there are adopted, for example, metal cables or optical fibers.

The control section 10 is a device for controlling the head-mount type display device 100. The control section 10 includes a determination key 11, a lighting section 12, a display switching key 13, a track pad 14, a luminance switching key 15, direction keys 16, a menu key 17, and a power switch 18. The determination key 11 detects a holding-down operation, and then outputs a signal used in the control section 10 for determining the content of the operation. The lighting section 12 notifies the operation state of the head-mount type display device 100 with the lighting state of the lighting section 12. As the operation state of the head-mount type display device 100, there can be cited, for example, an ON/OFF state of the power. As the lighting section 12, there is used, for example, a light emitting diode (LED). The display switching key 13 detects a holding-down operation, and then outputs, for example, a signal for switching the display mode of the contents moving image between 3D and 2D. The track pad 14 detects the finger operation of the user on the operation surface of the track pad 14, and then outputs a signal corresponding to the detection content. As the track pad 14, a variety of types of track pad such as an electrostatic track pad, a pressure-detection track pad, or an optical track pad. The luminance switching key 15 detects a holding-down operation, and then outputs a signal for increasing or decreasing the luminance of the image display section 20. The direction keys 16 detect a holding-down operation to the keys corresponding to up, down, right, and left directions, and then output a signal corresponding to the detection content. The power switch 18 detects a sliding operation of the switch to thereby switch the powering state of the head-mount type display device 100.

Figure 2:
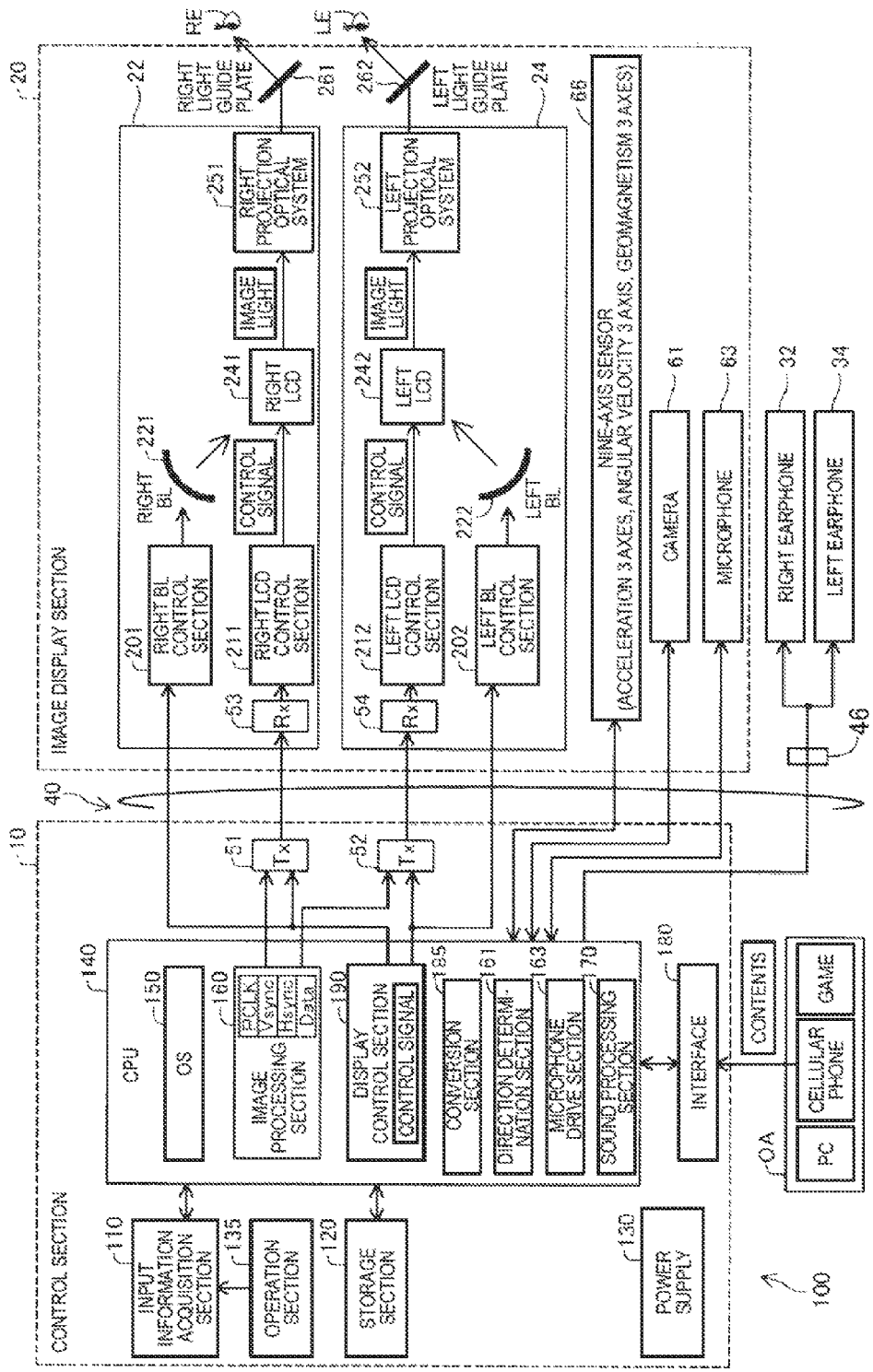
FIG. 2 is a block diagram functionally showing a configuration of the head-mount type display device 100.

FIG. 2 is a block diagram functionally showing a configuration of the head-mount type display device 100. As shown in FIG. 2, the control section 10 includes a CPU 140, an operation section 135, an input information acquisition section 110, a storage section 120, a power supply 130, an interface 180, a transmitting section 51 (Tx 51), and a transmitting section 52 (Tx 52). The operation section 135 receives the operation by the user, and includes the determination key 11, the display switching key 13, the track pad 14, the luminance switching key 15, the direction keys 16, the menu key 17, and the power switch 18.

The input information acquisition section 110 obtains the signals corresponding to the operation input by the user. As the signals corresponding to the operation inputs, there can be cited the signals corresponding to the operation inputs with respect to, for example, the track pad 14, the direction keys 16, and the power switch 18. The power supply 130 supplies each of the constituents of the head-mount type display device 100 with electrical power. As the power supply 130, a secondary battery, for example, can be used. The storage section 120 stores a variety of computer programs. The storage section 120 includes a ROM, a RAM, and so on. The CPU 140 retrieves and then executes the computer programs stored in the storage section 120 to thereby function as an operating system 150 (OS 150), an image processing section 160, a display control section 190, a microphone drive section 163, a conversion section 185, a sound processing section 170, and a direction determination section 161.

The image processing section 160 acquires the image signal included in the content. The image processing section 160 separates sync signals such as a vertical sync signal VSync and a horizontal sync signal HSync from the image signal thus acquired. Further, the image processing section 160 generates a clock signal PCLK using a phase locked loop (PLL) circuit or the like (not shown) in accordance with the periods of the vertical sync signal VSync and the horizontal sync signal HSync thus separated. The image processing section 160 converts the analog image signal, from which the sync signals are separated, into a digital image signal using an A/D conversion circuit or the like (not shown). Subsequently, the image processing section 160 stores the digital image signal thus converted into a DRAM in the storage section 120 frame by frame as the image data Data (RGB data) of the object image. It should be noted that it is also possible for the image processing section 160 to perform image processing such as a resolution conversion process, various color correction processes of, for example, adjustment of luminance and chromaticness, or a keystone distortion correction process on the image data if necessary.

The image processing section 160 transmits each of the clock signal PCLK, the vertical sync signal VSync, the horizontal sync signal HSync thus generated, and the image data Data stored in the DRAM in the storage section 120 via each of the transmitting sections 51 and 52. It should be noted that the image data Data transmitted via the transmitting section 51 is also referred to as "right eye image data," and the image data Data transmitted via the transmitting section is also referred to as "left eye image data." The transmitting sections 51, 52 function as transmitters for serial transmission between the control section 10 and the image display section 20.

The display control section 190 generates control signals for controlling the right display drive section 22 and the left display drive section 24. Specifically, the display control section 190 controls ON/OFF of driving of a right LCD 241 by a right LCD control section 211, ON/OFF of driving of a right backlight 221 by a right backlight control section 201, ON/OFF of a left LCD 242 by a left LCD control section 212, ON/OFF of driving of a left backlight 222 by a left backlight control section 202, and so on individually using the control signals. Thus, the display control section 190 controls generation and emission of the image light by each of the right display drive section 22 and the left display drive section 24. For example, the display control section 190 makes both of the right display drive section 22 and the left display drive section 24 generate image light, makes either of them generate the image light, or inhibits the both from generating the image light.

The display control section 190 transmits the control signals to the right LCD control section 211 and the left LCD control section 212 via the transmitting sections 51, 52, respectively. Further, the display control section 190 transmits the control signals to the right backlight control section 201 and the left backlight control section 202, respectively. The microphone drive section 163 sets the direction of the microphone 63. When the sound source (hereinafter also referred to as a "target sound source") of the voice the user wants to obtain is specified by the operation received by the operation section 135, the microphone drive section 163 changes the direction of the microphone 63 so that the sensitivity in obtaining the voice from the target sound source is maximized. The microphone drive section 163 obtains the position and the direction of the image display section 20 detected by a nine-axis sensor 66 described later. Thus, it is possible for the microphone drive section 163 to change the direction of the microphone 63 so that the sensitivity of the microphone 63 in obtaining the voice from the direction (hereinafter also referred to as a "sound source direction") from the microphone 63 toward the target sound source is always maximized irrespective of the positional relationship between the image display section 20 and the target sound source. Therefore, in the head-mount type display device 100 according to this embodiment, since the microphone 63 obtains the voice from the sound source direction at a high sensitivity, and the larger the difference from the sound source direction is, the more difficult it becomes to obtain the voice, the accuracy of the character image representing the voice thus obtained is improved. It should be noted that the operation section 135 corresponds to a specific direction setting section in the appended claims, and the microphone 63 and the microphone drive section 163 correspond to a voice acquisition section in the appended claims.

The conversion section 185 converts the voice obtained by the microphone 63 into a character image expressing the voice with characters. The display control section 190 transmits the character image to the image display section 20 as control signals representing the character image. The image display section 20 generates the image light representing the character images based on the control signals thus transmitted, and then emits the image light to the eyes of the user, and thus the user can visually recognize the voice as the character images.

The direction determination section 161 determines whether or not an angle is equal to or larger than a predetermined threshold level, wherein the angle is formed between the sound source direction and the eye direction of the user estimated from the direction of the image display section 20 detected by the nine-axis sensor 66 described later. Further, the direction determination section 161 determines whether or not the user is visually recognizing the target sound source in the external sight based on the angle formed between the sound source direction and the eye direction. It should be noted that the angle formed between the specific direction thus set and the eye direction of the user corresponds to a specific angle in the appended claims, and the angle formed between the sound source direction set as an example of the specific direction and the eye direction of the user also corresponds to the specific angle.

The sound processing section 170 acquires a sound signal included in the content, amplifies the sound signal thus acquired, and then supplies it to a speaker (not shown) in the right earphone 32 and a speaker (not shown) in the left earphone 34 connected to the connecting member 46. It should be noted that in the case of, for example, adopting a Dolby (registered trademark) system, a processing on the sound signal is performed, and sounds different from each other and with, for example, modified frequencies are output respectively from the right earphone 32 and the left earphone 34. Further, the sound processing section 170 extracts features from the voice obtained by the microphone 63 and modeling the voice to thereby perform speaker recognition of individually recognizing voices of a plurality of humans, and thus identifying the human for each of the voices. The sound processing section 170 corresponds to a sound identification section in the appended claims.

The interface 180 is an interface for connecting various external equipment OA to be a supply source of contents to the control section 10. As the external equipment OA, there can be cited, for example, a personal computer (PC), a cellular phone terminal, and a game terminal. As the interface 180, there can be used, for example, a USB interface, a micro USB interface, and an interface for a memory card.

The image display section 20 is provided with the right display drive section 22, the left display drive section 24, the right light guide plate 261 as the right optical image display section 26, the left light guide plate 262 as the left optical image display section 28, the camera 61, the nine-axis sensor 66, and the microphone 63.

The nine-axis sensor 66 is a motion sensor for detecting accelerations (three axes), angular velocities (3 axes), and geomagnetisms (3 axes). The nine-axis sensor 66 is provided to the image display section 20, and therefore detects a movement of the head of the user when the image display section 20 is mounted on the head of the user. Since the direction of the image display section 20 can be found from the movement of the head of the user thus detected, the direction determination section 161 can estimate the eye direction of the user. The direction determination section 161 and the nine-axis sensor 66 correspond to an eye direction estimation section in the appended claims. The microphone 63 transmits the sound signal of the voice thus obtained to the conversion section 185 and the sound processing section 170.

The right display drive section 22 includes a receiving section 53 (Rx 53), the right backlight control section 201 (right BL control section 201) and the right backlight 221 (right BL 221) functioning as the light source, the right LCD control section 211 and the right LCD 241 functioning as the display element, and a right projection optical system 251. The right backlight control section 201 and the right backlight 221 function as the light source. The right LCD control section 211 and the right LCD 241 function as the display element. It should be noted that the right backlight control section 201, the right LCD control section 211, the right backlight 221, and the right LCD 241 are also collectively referred to as an "image light generation section."

The receiving section 53 functions as a receiver for serial transmission between the control section 10 and the image display section 20. The right backlight control section 201 drives the right backlight 221 based on the control signal input to the right backlight control section 201. The right backlight 221 is a light emitter such as an LED or electroluminescence (EL). The right LCD control section 211 drives the right LCD 241 based on the clock signal PCLK input via the receiving section 53, the vertical sync signal VSync, the horizontal sync signal HSync, and right-eye image data Data1. The right LCD 241 is a transmissive liquid crystal panel having a plurality of pixels arranged in a matrix.

The right projection optical system 251 is formed of a collimating lens for converting the image light emitted from the right LCD 241 into a light beam in a parallel state. The right light guide plate 261 as the right optical image display section 26 guides the image light, which is output from the right projection optical system 251, to the right eye RE of the user while reflecting the image light along a predetermined light path. It should be noted that the right projection optical system 251 and the right light guide plate 261 are also collectively referred to as a "light guide section."

The left display drive section 24 has substantially the same configuration as that of the right display drive section 22. The left display drive section 24 includes a receiving section 54 (Rx 54), the left backlight control section 202 (left BL control section 202) and the left backlight 222 (left BL 222) functioning as the light source, the left LCD control section 212 and the left LCD 242 functioning as the display element, and a left projection optical system 252. The left backlight control section 202 and the left backlight 222 function as the light source. The left LCD control section 212 and the left LCD 242 function as the display element. It should be noted that the left backlight control section 202, the left LCD control section 212, the left backlight 222, and the left LCD 242 are also collectively referred to as an "image light generation section." Further, the left projection optical system 252 is formed of a collimating lens for converting the image light emitted from the left LCD 242 into a light beam in a parallel state. The left light guide plate 262 as the left optical image display section 28 guides the image light, which is output from the left projection optical system 252, to the left eye LE of the user while reflecting the image light along a predetermined light path. It should be noted that the left projection optical system 252 and the left light guide plate 262 are also collectively referred to as a "light guide section."

A-2. Image Display Processing of Obtained Voice

Figure 3:
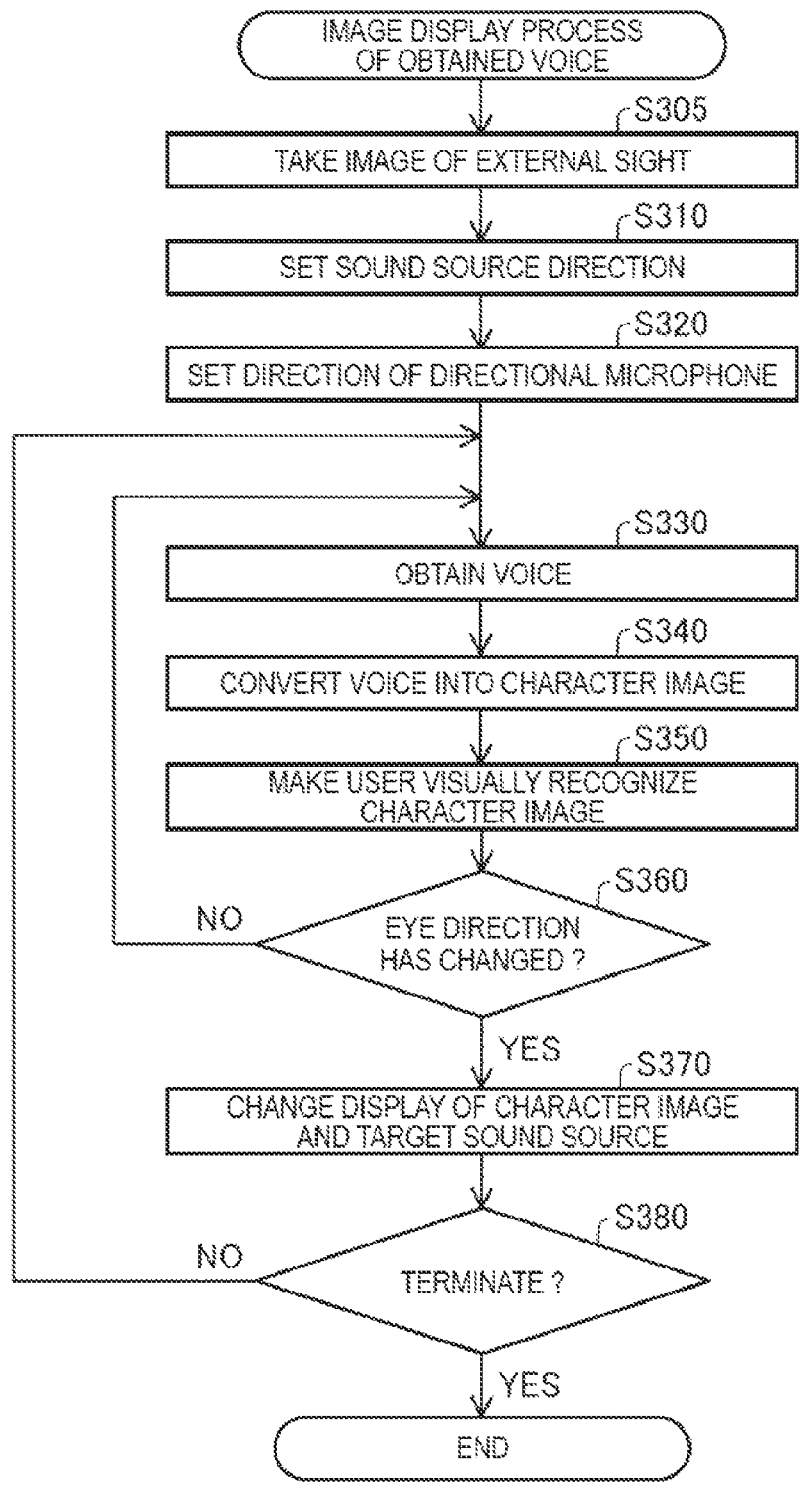
FIG. 3 is an explanatory diagram showing the flow of an image display process of an obtained voice.

FIG. 3 is an explanatory diagram showing the flow of an image display process of an obtained voice. FIG. 3 shows the flow of the process of displaying the voice obtained by the microphone 63 on the image display section 20 as the character image.

Figure 4:
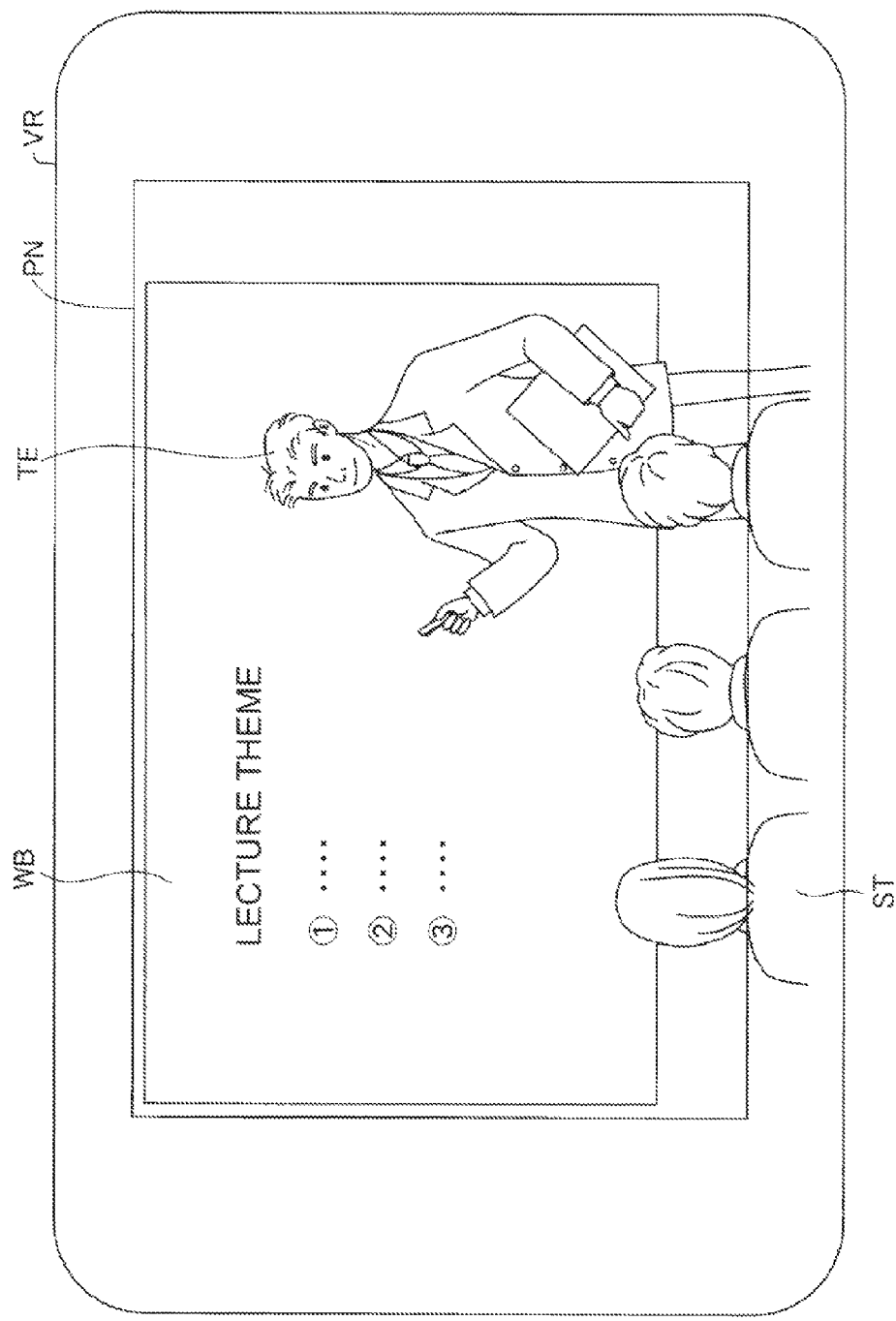
FIG. 4 is an explanatory diagram showing an example of a visual field VR of the user.

Firstly, the camera 61 takes (step S305) an image of the external sight. FIG. 4 is an explanatory diagram showing an example of a visual field VR of the user. FIG. 4 shows the visual field VR, which the user can visually recognize, and the maximum image display area PN as the area in which the image display section 20 can display an image. As shown in FIG. 4, as the external sight, the user can visually recognize a teacher TE as the target sound source, and a plurality of students ST listening to the words of the teacher TE. Further, the user can visually recognize the characters written on a whiteboard WB by the teacher TE. The user can take the image of the external sight, which the user is visually recognizing, using the camera 61 by operating the operation section 135. It should be noted that the external sight, which the user is visually recognizing, and the external sight to be imaged by the camera 61 may be different from each other depending on the eye direction of the user, the direction of the camera 61, and so on. Therefore, it is also possible to adopt a configuration in which the image of the external sight to be imaged by the camera 61 is displayed in the maximum image display area PN to make the user visually recognize the external sight before the camera 61 takes the image of the external sight, and the user operates the operation section 135 to correct the image of the external sight to be taken so as to approximate to the external sight visually recognized in the visual field VR of the user.

Figure 5:
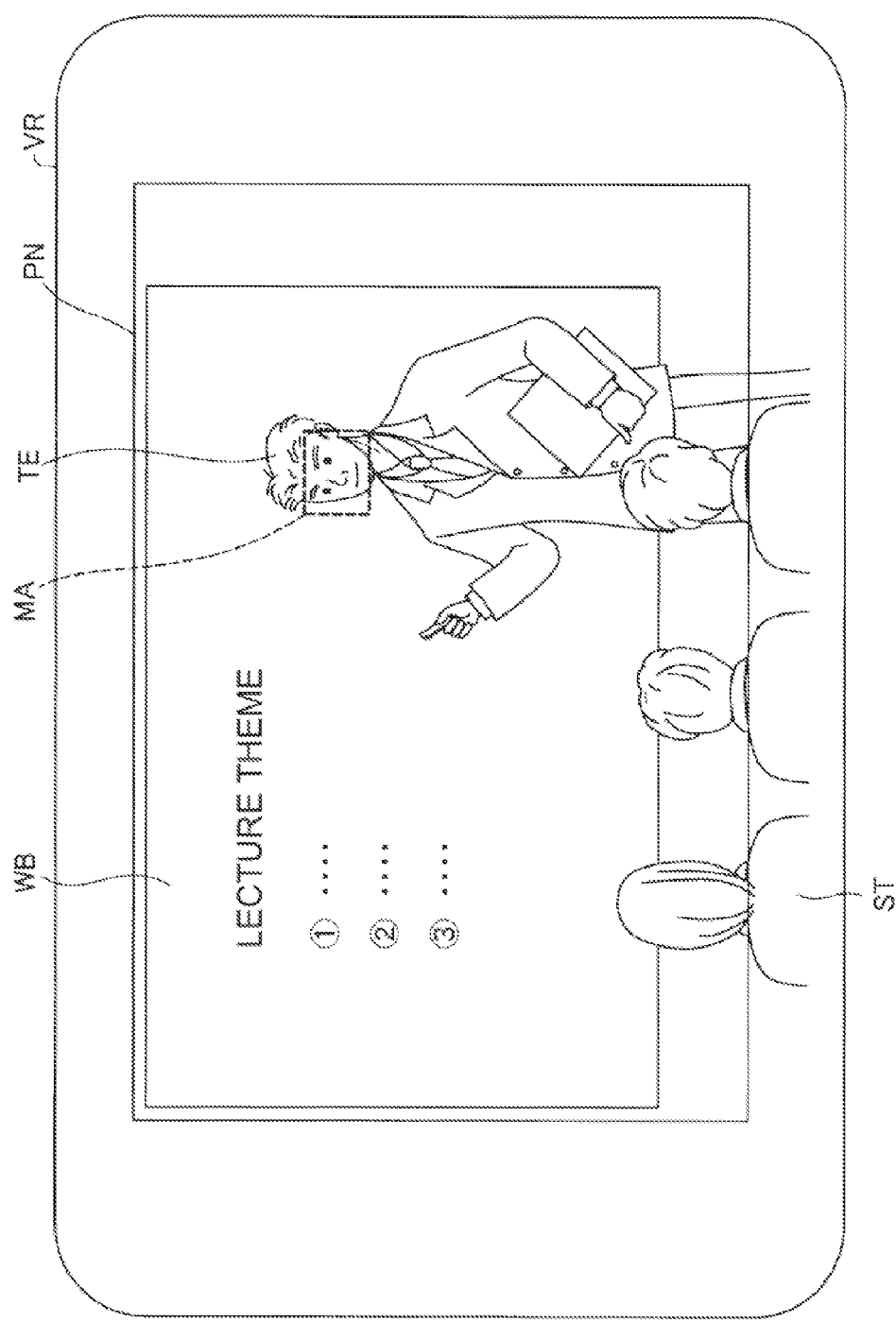
FIG. 5 is an explanatory diagram showing an example of an image of an external sight taken by a camera 61.

Subsequently, the user sets the sound source direction (step S310). FIG. 5 is an explanatory diagram showing an example of the image of the external sight taken by the camera 61. FIG. 5 shows the state in which when the user identifies the target sound source, the image of the external sight taken by the camera 61 is displayed in the entire area of the maximum image display area PN, and the user visually recognizes the external sight in the area, which is inside the visual field VR of the user, and other than the maximum image display area PN. When the user performs a predetermined operation in the case of attempting to identify the target sound source, the image processing section 160 performs facial recognition on the image presently displayed in the maximum image display area PN to thereby extract the teacher TE as a candidate of the target sound source. As shown in FIG. 5, when the teacher TE is extracted in the image displayed in the maximum image display area PN, the image display section 20 displays a frame MA in the maximum image display area PN, wherein the frame MA has a rectangular shape and blinks while surrounding the face of the teacher TE. When the user holds down the determination key 11 in this state, the teacher TE is identified as the target sound source, and the sound source direction is set. When the target sound source is identified, the storage section 120 stores the image in the frame MA in the image displayed in the maximum image display area PN as the image of the target sound source. Therefore, in the head-mount type display device 100 according to this embodiment, since the specific direction set in the operation section 135 corresponds to the sound source direction, the voice obtained from the sound source can be displayed in the maximum image display area PN so as to be associated with the sound source, and thus the degree of understanding of the user in visually recognizing the voice can be improved.

When the image of the target sound source is stored, the image display section 20 stops displaying the image of the external sight thus taken in the maximum image display area PN, and it becomes possible for the user to visually recognize the teacher TE and the students ST as the external sight. It should be noted that the sound source direction thus set is an absolute direction from the microphone 63 toward the target sound source irrespective of the direction of the image display section 20.

When the sound source direction is set, then the microphone drive section 163 sets (step S320 in FIG. 3) the direction of the microphone 63. The microphone drive section 163 sets the direction with which the sensitivity of the microphone 63 in obtaining the voice from the sound source direction is maximized. When the direction is set, the microphone 63 obtains (step S330) the voice. Subsequently, the conversion section 185 converts (step S340) the voice obtained by the microphone 63 into a character image representing the voice. The image processing section 160 and the image display section 20 allow (step S350) the user to visually recognize the character image.

Figure 6:
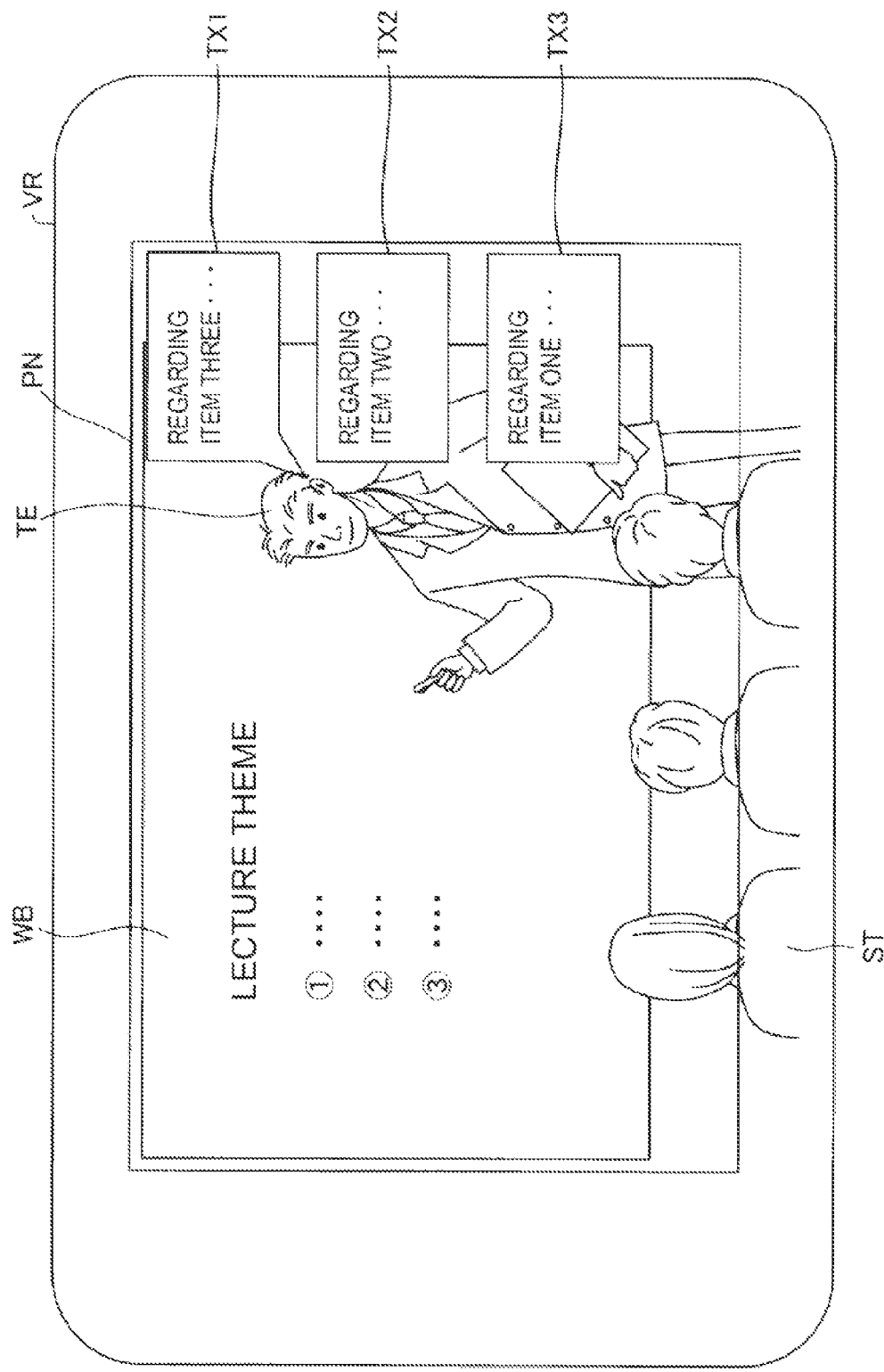
FIG. 6 is an explanatory diagram showing an example of the visual field VR of the user.

FIG. 6 is an explanatory diagram showing an example of the visual field VR of the user. FIG. 6 shows the state in which the user is visually recognizing a text image TX1, a text image TX2, and a text image TX3 (hereinafter also referred to collectively as a "text image group") expressing the voice of the teacher TE as the character images in addition to the external sight. The text image TX1 is the character image representing the voice of the teacher TE while being converted and then updated in real time. The text image TX2 and the text image TX3 are each the character image representing the voice of the teacher TE let out a predetermined time before the voice of the teacher TE represented by the text image TX1 is let out. The text image group is displayed at positions in the visual field VR, wherein the positions do not overlap the teacher TE existing in the sound source direction, and are included in the vicinity of the teacher TE. Therefore, in the head-mount type display device 100 according to the first embodiment, since the text image group including the character images representing the voice obtained from the target sound source is displayed at a position not overlapping the sound source direction, the user more easily recognizes the speaker and the voice of the speaker so as to be associated with each other.

In this embodiment, the text image TX1 is displayed in the vicinity of the position where the sound source direction is visually recognized in the visual field VR of the user. In general, it is known that the visual field VR of the user is up to about 200 degrees in the horizontal direction, and about 125 degrees in the direction of gravitational force. In the present specification, the vicinity of the sound source direction in the visual field VR of the user denotes an area within the view angle of the user of 60 degrees centered on the sound source direction. It is further preferable that the text image TX1 is displayed within the view angle of the user of 45 degrees centered on the sound source direction.

Further, the text image TX1 and so on are displayed in an area other than the central part in the visual field VR of the user. In the present specification, the area other than the central part in the visual field VR of the user denotes a range obtained by removing a range within 30 degrees in the right, left, upper, and lower directions from the center of the visual field VR of the user. Further, it is more preferable that the text image TX1 and so on are displayed in a range obtained by removing a range within 45 degrees in the right, left, upper, and lower directions with respect to the center of the visual field VR. It should be noted that the image processing section 160 and the image display section 20 correspond to a display position setting section in the appended claims.

After a predetermined time has elapsed, the text image TX1 is displayed as the character image as a block instead of the speech balloon from the teacher TE similarly to the text image TX2 and the text image TX3. In the character image as a block, the character image representing the voice of the teacher TE let out in one minute is displayed. Therefore, a new block of text image is generated every one minute. In the display configuration of the text image group shown in FIG. 6, up to three the text image blocks are displayed, and in the case in which a new text image block is generated, the oldest one of the text image blocks is eliminated from the display in the maximum image display area PN. The storage section 120 automatically stores the text image group having been displayed in the maximum image display area PN after dividing the text image group into the test image blocks regardless of display/non-display of the text image block in the maximum image display area PN. It should be noted that in another embodiment, one text image block does not need to correspond to the voice obtained in one minute, but can also correspond to the voice obtained in two minutes, or it is also possible that the text image group is displayed in a lump as a single text image block.

Subsequently, whether or not the eye direction of the user has changed is determined (step S360 in FIG. 3). As shown in FIGS. 4 through 6, at the present moment in this embodiment, the user continues to visually recognize the teacher TE existing in the sound source direction, and the sound source direction and the eye direction of the user are roughly the same directions.

The direction determination section 161 determines whether or not the eye direction varies to make the angle formed between the sound source direction and the eye direction equal to or greater than 30 degrees. In the case in which it is determined that the eye direction of the user hardly moves and the angle formed between the eye direction of the user and the sound source direction is smaller than 30 degrees (NO in the step S360), the character image continues to be displayed at the position not overlapping the teacher TE in the visual field VR, and located in the vicinity of the teacher TE other than the central part of the maximum image display area PN. It should be noted that in the case in which the eye direction of the user has moved within the range smaller than 30 degrees, the position where the text image group is displayed in the maximum image display area PN is changed in accordance with the angle formed between the sound source direction and the eye direction. It should be noted that the value of 30 degrees as the angle formed between the eye direction and the sound source direction corresponds to a first threshold value and the second threshold value in the appended claims. Therefore, in the head-mount type display device 100 according to this embodiment, in the case in which the sound source direction is visually recognized in the visual field VR of the user as the external sight, the text image TX1 and so on are displayed in the vicinity of the sound source direction in the maximum image display area PN, and therefore, the degree of understanding of the user with respect to the voice thus obtain is improved.

In the case in which it is determined that the eye direction varies to make the angle formed between the eye direction and the sound source direction equal to or larger than 30 degrees (YES in the step S360), the direction determination section 161 determines that the target sound source is not visually recognized in the visual field VR of the user. In this case, the image processing section 160 displays the image of the target sound source taken by the camera 61 in the maximum image display area PN, and at the same time, change (step S370) the position where the character image is displayed.

Figure 7:
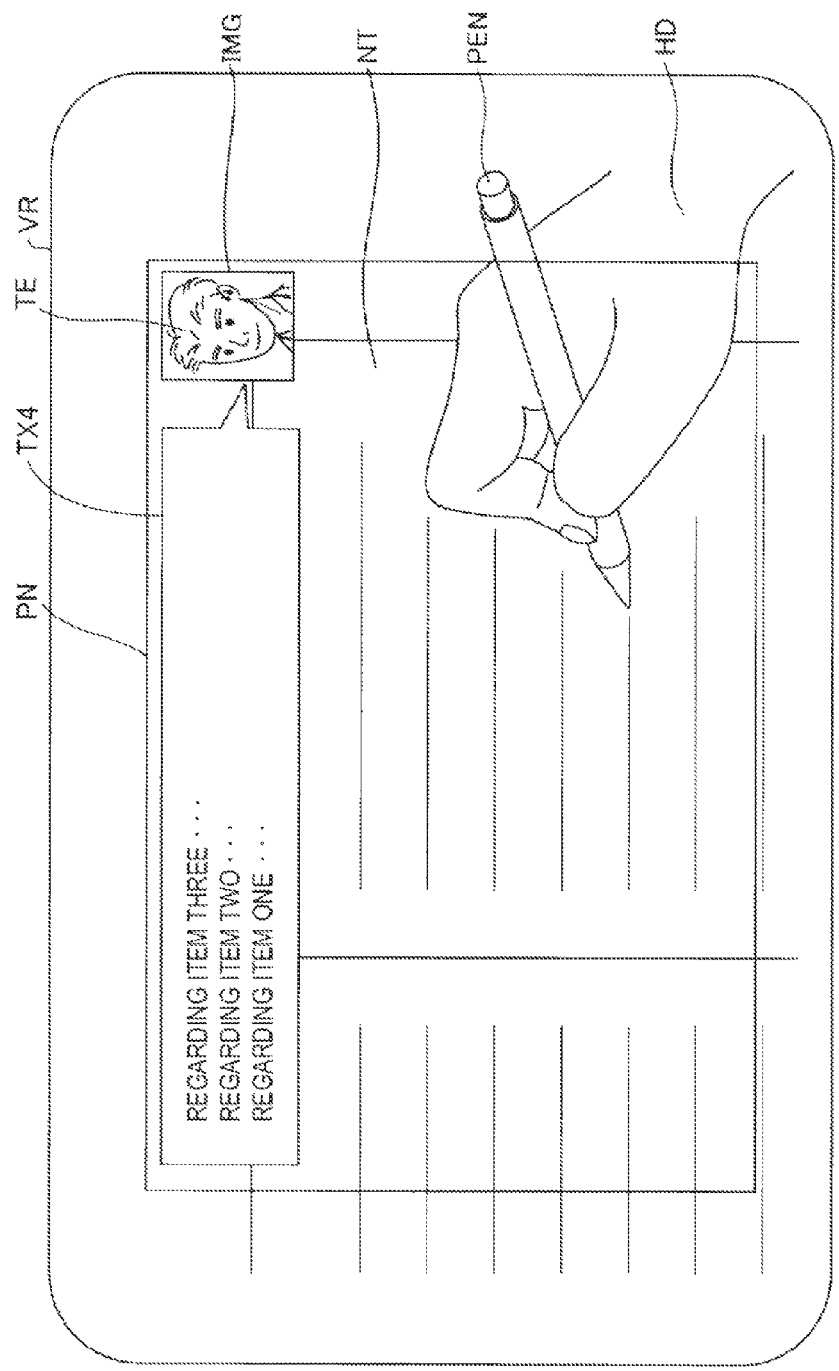
FIG. 7 is an explanatory diagram showing an example of the visual field VR of the user.

FIG. 7 is an explanatory diagram showing an example of the visual field VR of the user. FIG. 7 shows the state in which the eye direction of the user changes downward from the sound source direction, and the user takes a memo on a notebook NT using a pen PEN gripped by a hand HD. As shown in FIG. 7, on the upper side of the maximum image display area PN, the character image is displayed after being updated to the text image TX4 in real time. Further, in the maximum image display area PN, on the right side of the text image TX4, there is displayed an image of the teacher TE, which is the target sound source, as an image IMG. Unlike the text image group shown in FIG. 6, the text image TX4 is displayed as a block of character image regardless of the time having elapsed from the acquisition of the voice. Further, the text image TX4 is displayed without overlapping the image IMG and in the vicinity of the image IMG in the maximum image display area PN. It should be noted that in this embodiment, the position where the text image TX4 is displayed and the position of the image IMG are set in advance. In other words, in the case in which the angle formed between the eye direction and the sound source direction is equal to or larger than 30 degrees, the text image TX4 is displayed at a position unrelated to the sound source direction in the maximum image display area PN. Therefore, in the head-mount type display device 100 according to this embodiment, since the image IMG in the sound source direction and the character image are displayed close to each other in the maximum image display area PN even if the sound source direction is not visually recognized in the external sight, the degree of understanding of the user with respect to the voice thus obtained is improved.

Subsequently, whether or not the image display process of the obtained voice is to be terminated is determined (step S380 in FIG. 3). In the case in which it is determined that the image display process of the obtained voice is to be performed (NO in the step S380), the process in the steps S330 through S370 is continuously performed. In the case in which it is determined that the image display process of the obtained voice is to be terminated (YES in the step S380), the image display process of the obtained voice is terminated in response to a predetermined operation performed by the user.

As explained hereinabove, in the head-mount type display device 100 according to this embodiment, the conversion section 185 converts the voice obtained by the microphone 63 into the character image. The sound source direction is identified due to the operation of the operation section 135. The image processing section 160 and the image display section 20 set the position of the character image to be displayed in the maximum image display area PN based on the sound source direction. Therefore, in the head-mount type display device 100, it is possible to make the user visually recognize the voice obtained by the user as the text image TX1 and so on representing the voice based on the direction set by the user, and thus, the degree of understanding of recognizing the voice in the user can be improved. Further, since the position where the text image TX1 and so on representing the voice obtained are displayed in the maximum image display area PN is set based on the direction set by the user, it is easy for the user to recognize the relationship between the direction thus set and the text image TX1 and so on, and the convenience of the user is enhanced.

Further, in the head-mount type display device 100 according to this embodiment, the nine-axis sensor 66 and the direction determination section 161 estimate the eye direction of the user in accordance with the direction of the image display section 20. The image processing section 160 and the image display section 20 set the position where the character image representing the voice thus obtained is displayed in the visual field VR of the user based on the difference between the sound source direction and the eye direction. Therefore, in the head-mount type display device 100 according to this embodiment, since whether or not the sound source is visually recognized in the visual field VR of the user is determined in accordance with the difference between the sound source direction and the eye direction, and the position where the character image is displayed is set, it is easy for the user to recognize the sound source and the character image so as to be associated with each other.

B-1. Second Embodiment

Figure 8:
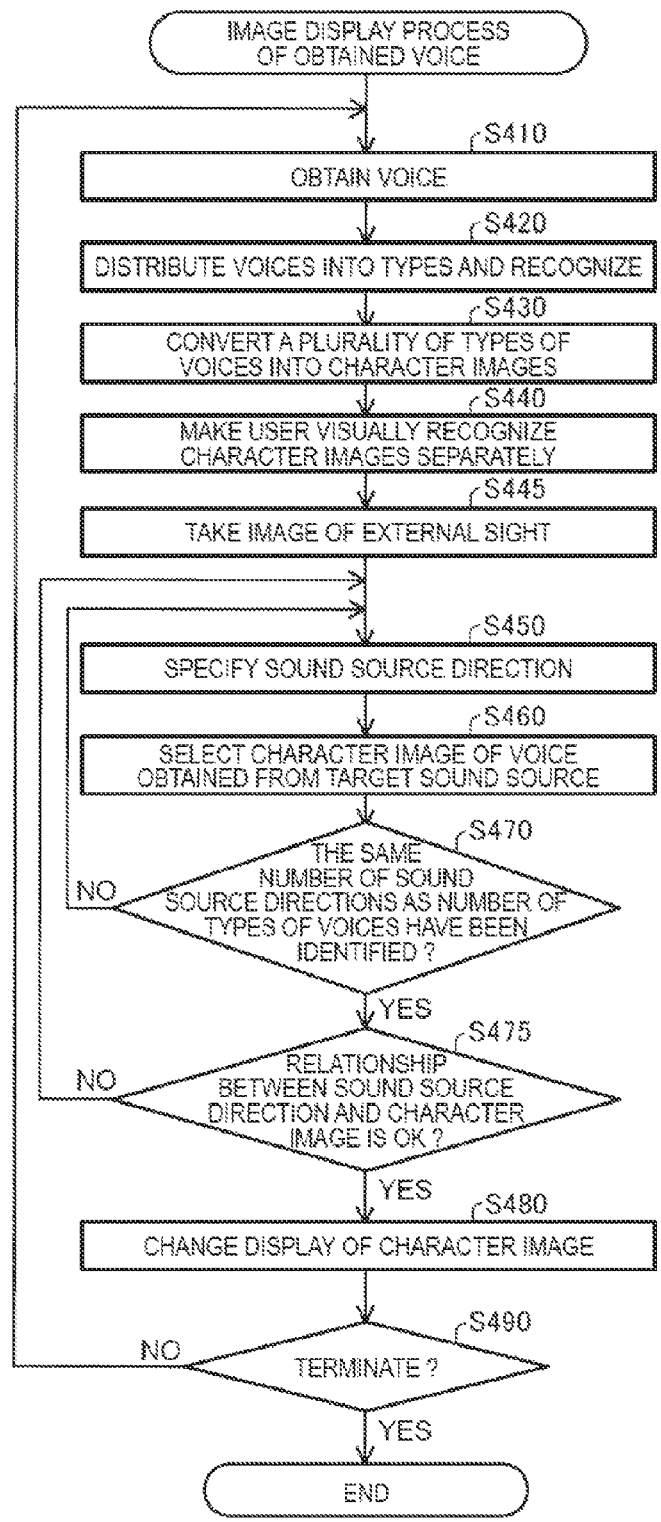
FIG. 8 is an explanatory diagram showing the flow of an image display process of an obtained voice in a second embodiment.

FIG. 8 is an explanatory diagram showing the flow of an image display process of an obtained voice in a second embodiment. FIG. 8 shows the flow of the process of displaying the character images representing a plurality of different types of voices separately from each other. In the head-mount type display device 100a according to the second embodiment, an omnidirectional microphone 63a obtains different types of voices from a plurality of sound sources instead of the microphone 63 in the first embodiment, and the sound processing section 170 identifies the plurality of voices thus obtained type by type.

Firstly, the microphone 63a obtains (step S410) the voices with respective types different from each other from the plurality of sound sources. The sound processing section 170 extracts a feature of the voice from each of the plurality of types of voices thus obtained to model the voices, and then recognize (step S420) the voices while identifying the voices type by type (hereinafter also referred to as "speaker recognition"). It should be noted that at this moment, the sound processing section 170 performs only the identification of the types of the voices, and the correspondence relationship between the sound source and the voice obtained from the sound source is not identified. Subsequently, the conversion section 185 converts (step S430) the plurality of types of voices into character images representing the voices. The image processing section 160 transmits the character images to the image display section 20 as the control signal, and then the image display section 20 allows (step S440) the user to visually recognize the character images while distributing the character images into the types of the voices.

Figure 9:
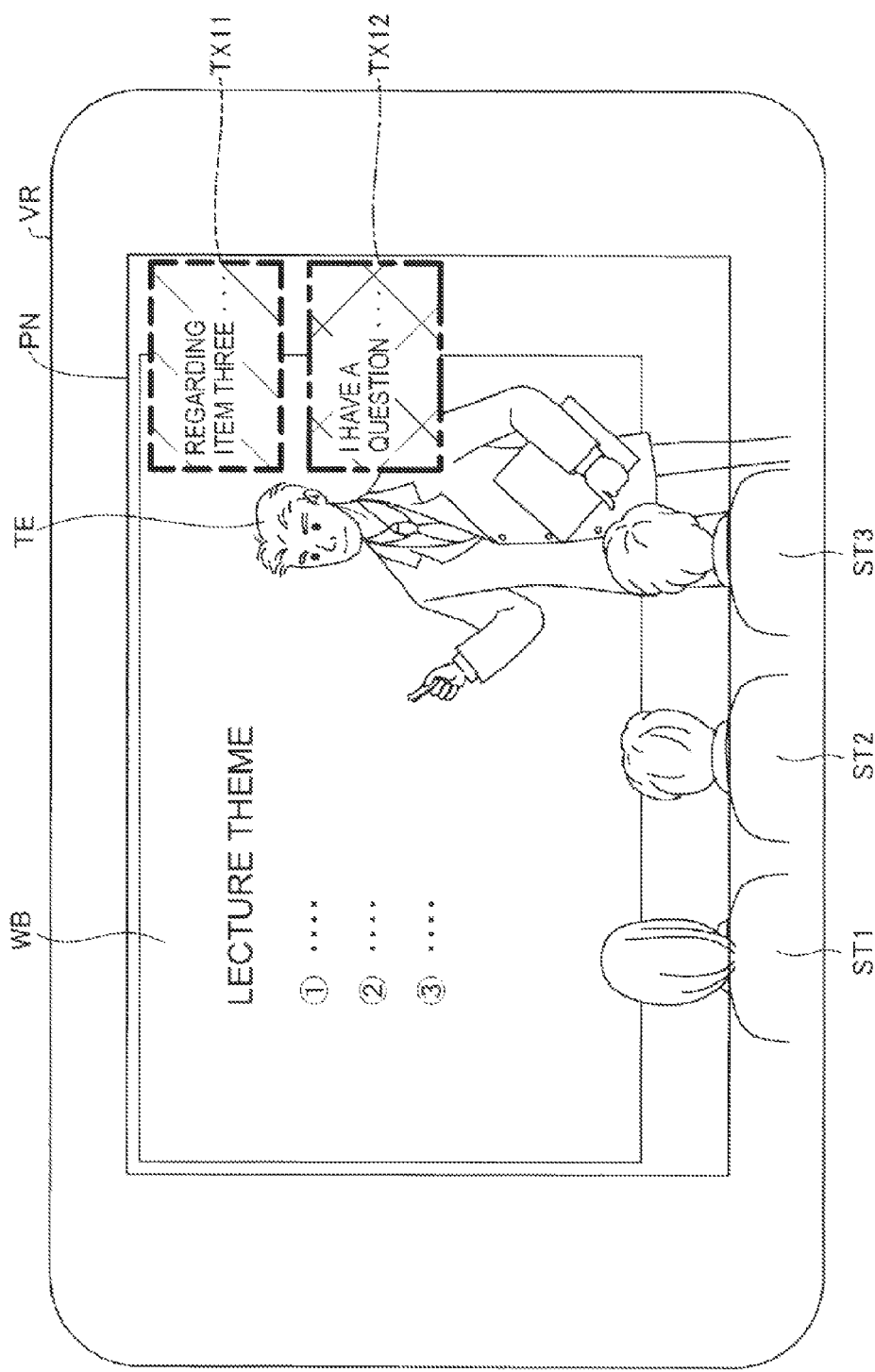
FIG. 9 is an explanatory diagram showing an example of the visual field VR of the user.

FIG. 9 is an explanatory diagram representing an example of the visual field VR of the user. FIG. 9 shows the state in which the user is visually recognizing the character image representing the voice of the teacher TE and the character image representing the voice of the student ST1 as the character images different from each other in addition to the external sight. As shown in FIG. 9, in the maximum image display area PN, a text image TX11 expressing the voice of the teacher TE as the character image is displayed in an upper right part other than the central part, and a text image TX12 expressing the voice of the student ST1 as the character image is displayed below the text image TX11. The text image TX11 and the text image TX12 are different from each other in a color of the characters and a color of the background in the character image, and are displayed in the maximum image display area PN as the character images representing the different types of voices.

Subsequently, the camera 61 takes (step S445 in FIG. 8) an image of the external sight. The process of the camera 61 for taking the image of the external sight is the same as the process described in the step S305 in FIG. 3 in the description of the first embodiment, and is therefore omitted from the explanation.

Figure 10:
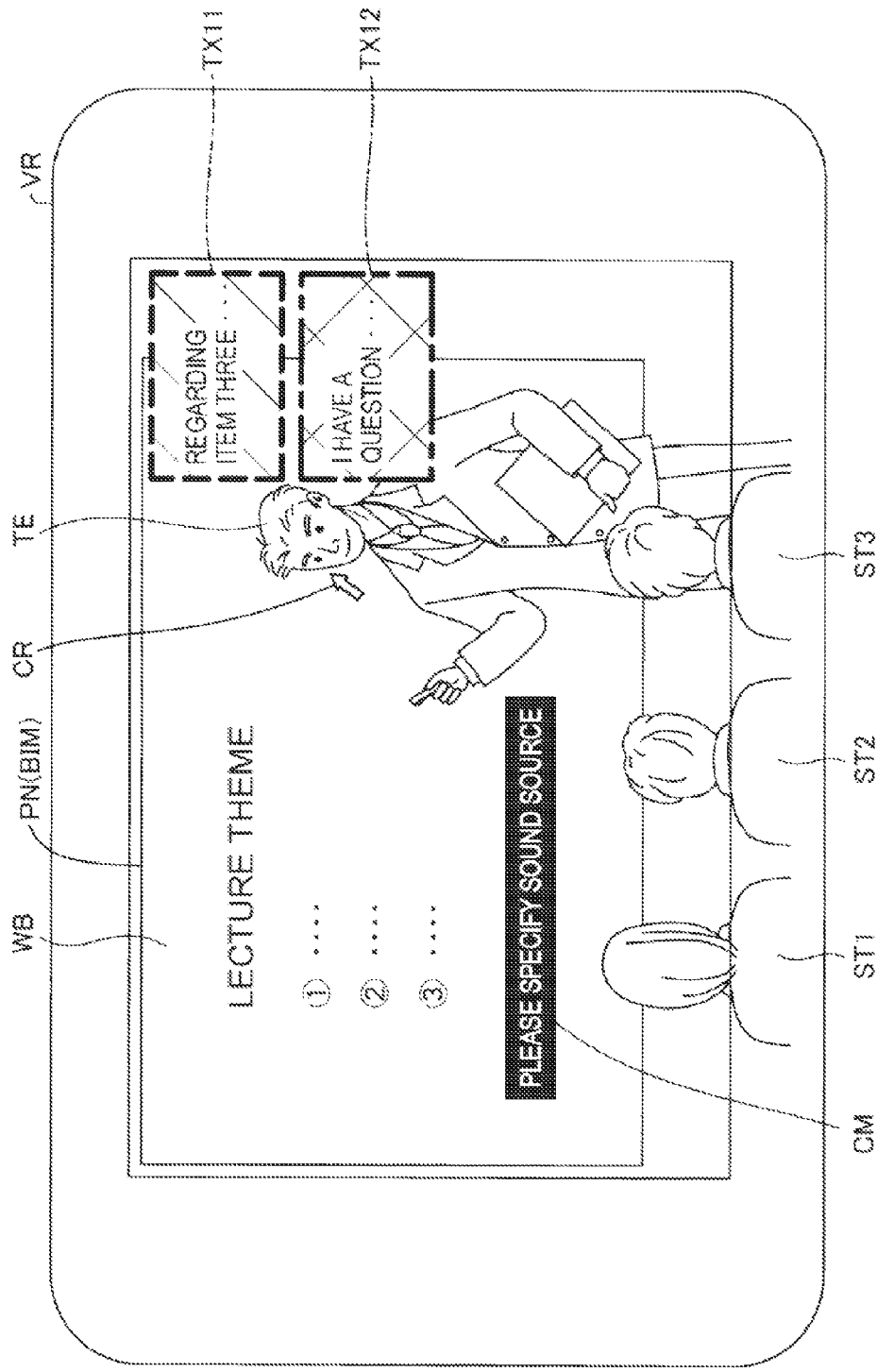
FIG. 10 is an explanatory diagram showing an example of an external sight image BIM taken by the camera 61.

Subsequently, the user operates the operation section 135 to select one of the sound sources from the images thus taken and displayed in the maximum image display area PN to thereby specify (step S450) one sound source direction among a plurality of sound source directions from the microphone 63a to the plurality of sound sources. FIG. 10 is an explanatory diagram showing an example of an external sight image BIM taken by the camera 61. In FIG. 10, the external sight image BIM taken by the camera 61 is displayed in the maximum image display area PN. In the external sight image BIM, there are displayed the text image TX11 and the text image TX12 shown in FIG. 9, a cursor CR, and an instruction image CM. The instruction image CM is an image showing an instruction of the operation to be subsequently performed by the user. The cursor CR is an image moving on the maximum image display area PN in accordance with the operation of the direction keys 16 by the user. When the user moves the cursor CR so as to overlap the teacher TE as the target sound source displayed in the maximum image display area PN, and then holds down the determination key 11 following the instruction of "PLEASE SPECIFY THE SOUND SOURCE" displayed in the instruction image CM, one target sound source is selected, and at the same time, the sound source direction is specified.

Subsequently, the character image representing the voice obtained from the target sound source thus selected is selected (step S460 in FIG. 8). When the one target sound source is selected, the words displayed in the instruction image CM are changed to "PLEASE SELECT THE CHARACTER IMAGE OBTAINED FROM THE SELECTED SOUND SOURCE." When the user selects the text image TX11 as the character image representing the voice of the teacher TE, the sound processing section 170 recognizes that the voice of the type represented by the text image TX11 is the voice of the teacher TE.

Subsequently, the control section 10 determines (step S470) whether or not the same number of sound source directions as the number of the types of the voices have been specified (step S470). At this moment, since the sound source direction corresponding to the text image TX12 has not yet been set (NO in the step S470), the process in the steps S450, S460 is performed. When the user selects (step S450) the student ST1 as the target sound source, and then selects (step S460) the text image TX12 as the character image representing the voice of the student ST1, the sound processing section 170 recognizes that the voice of the type represented by the text image TX12 is the voice of the student ST1. Therefore, in the head-mount type display device 100a according to the second embodiment, the specific sound source direction and the character image representing the voice obtained from the specific sound source direction are set by a simple and convenient operation, and the user can easily perform setting of the speaker recognition.

When the user has specified the same number of sound sources directions as the number of the types of the voices (YES in the step S470), then the determination on whether or not the correspondence relationships between the sound source directions and the character images thus specified are correct is performed (step S475). If it is determined that the correspondence relationship is not correct (NO in the step S475), the process in the steps S450 through S470 is performed again on the combination of the sound source direction and the character image, the correspondence relationship of which has been determined to be incorrect.

If it is determined that the correspondence relationships between the sound source directions and the character images thus specified are correct (YES in the step S475), the image processing section 160 and the image display section 20 set the instruction image CM and the cursor CR to a non-display state, and then change (step S480) the way and the positions of the display of the text image TX11 and the text image TX12 in the maximum image display area PN.

Figure 11:
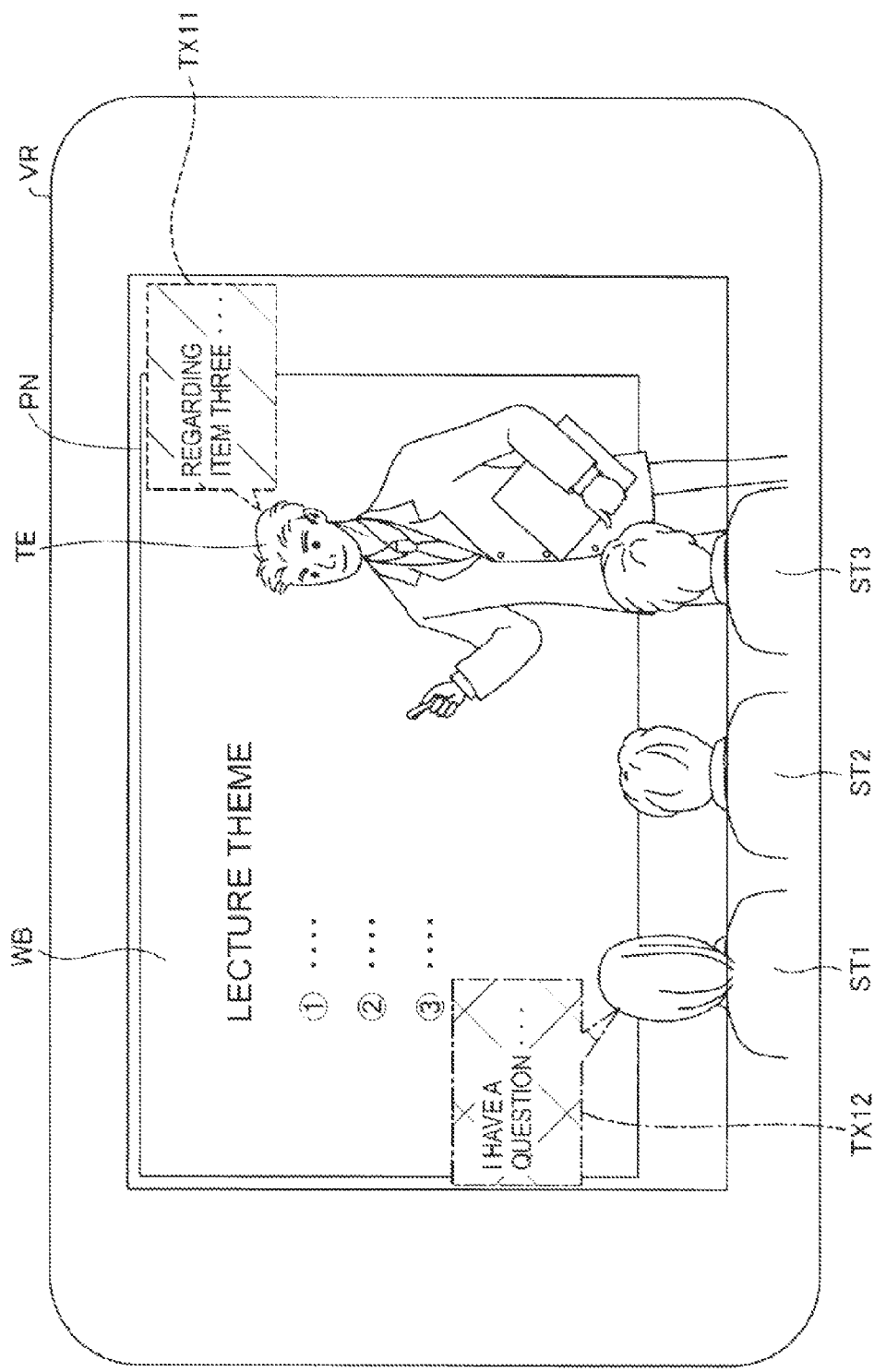
FIG. 11 is an explanatory diagram showing an example of the visual field VR of the user.

FIG. 11 is an explanatory diagram showing an example of the visual field VR of the user. In FIG. 11, the sound source directions thus specified and the character images representing the voices obtained from the specified sound source directions are respectively displayed so as to be associated with each other. As shown in FIG. 11, the text image TX11 is the character image representing the voice of the teacher TE, and is therefore an image of characters surrounded by a speech balloon from the teacher TE. Further, the text image TX12 is the character image representing the voice of the student ST1, and is therefore an image of characters surrounded by a speech balloon from the student ST1. In the text images TX11, TX12, the character images representing the voices obtained from the teacher TE and the student ST1 are displayed, respectively, after being updated in real time. The number of characters to be displayed in each of the text images TX11, TX12 is determined in advance, and if the determined number is exceeded, the characters corresponding to the excess are eliminated from the display. In another embodiment, it is also possible to determine whether or not the characters are displayed based on the time or the like instead of the number of the characters. Further, when a predetermined time has elapsed from the last voice obtained from the sound source direction without obtaining a voice of the same type, the character image is eliminated from the display in the maximum image display area PN. Although in this embodiment, the character image is eliminated from the display when 5 minutes as the predetermined time has elapsed, the predetermined time can also be the time other than 5 minutes in another embodiment.

Subsequently, whether or not the user terminates the image display process of the obtained voice is determined (step S490 in FIG. 8). The determination in the step S490 is the same as the determination in the step S380 in FIG. 3 related to the first embodiment, and is therefore omitted from the explanation.

As explained hereinabove, in the head-mount type display device 100a according to the second embodiment, the sound processing section 170 distributes the plurality of voices thus obtained into the types. The operation section 135 receives the operation by the user to thereby specify the direction from the microphone 63a to the sound source, from which the specific voice has been obtained among the plurality of types of voices obtained by the microphone 63a. In the visual field VR of the user, the image processing section 160 and the image display section 20 set the positions, where the text image TX11 and the text image TX12 are displayed in the maximum image display area PN, to be adjacent to the sound source direction from which the voices represented by the text image TX11 and the text image TX12 are obtained, respectively. Further, in the visual field VR of the user, the image processing section 160 and the image display section 20 set each of the positions, where the text image TX11 and the text image TX12 are displayed in the maximum image display area PN, to the position not overlapping any of the plurality of sound source directions. Therefore, in the head-mount type display device 100a according to the second embodiment, even in the case of a conversation including more than one person, the character images representing the voices of the speakers are displayed at positions adjacent to the respective speakers in the maximum image display area PN. Therefore, the user can recognize the speakers and the character images representing the voices of the respective speakers so as to be associated with each other with the sense of vision in addition to the sense of hearing, and thus, easily understands the content of the conversation. Further, since either of the character images representing the voices thus obtained is displayed at the position not overlapping any of the plurality of sound source directions, the user can visually recognize the speakers and the character images representing the voices of the respective speakers so as to be associated with each other.

B-2. Third Embodiment

Figure 13:
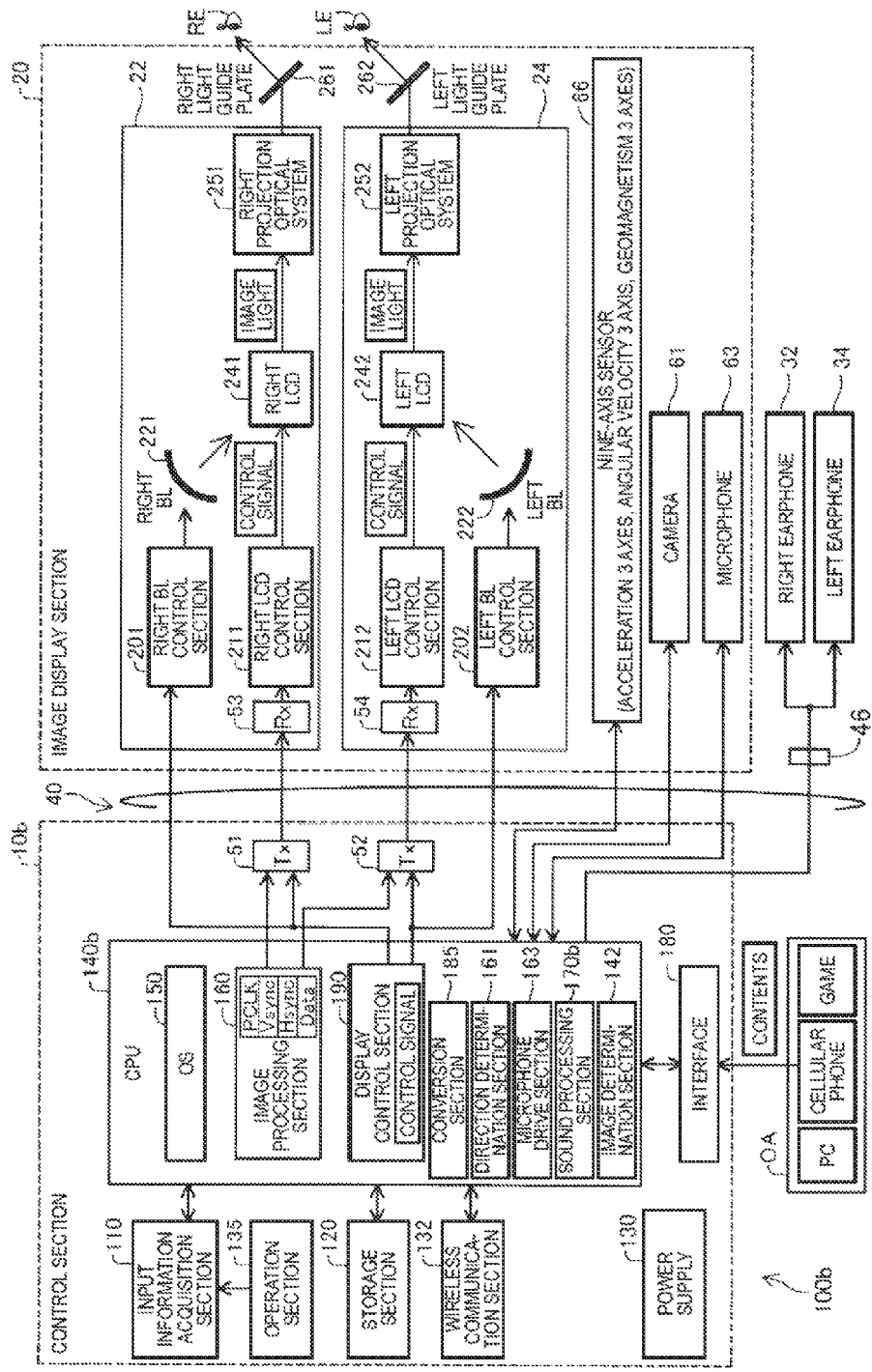
FIG. 13 is an explanatory diagram functionally showing a configuration of a head-mount type display device 100b according to a third embodiment.

FIG. 13 is an explanatory diagram functionally showing a configuration of a head-mount type display device 100b according to a third embodiment. The head-mount type display device 100b according to the third embodiment is different from the head-mount type display device 100 according to the embodiment described above in the point that a control section 10b includes a wireless communication section 132, and the point that a CPU 140b of the control section 10b functions as an image determination section 142. Further, in the third embodiment, a sound processing section 170b obtains a sound signal, which has been obtained by the wireless communication section 132, and is different from the voice obtained by the microphone 63, and then supplies speakers of the earphones 32, 34 with the sound signal as a voice.

The wireless communication section 132 performs wireless communication with other equipment under a predetermined wireless communication standard such as a wireless LAN or Bluetooth (registered trademark). The wireless communication section 132 performs the wireless communication to thereby obtain the sound signal representing the voice, which is different from the voice obtained by the microphone 63. As the sound signal obtained by the wireless communication section 132, there are included, for example, a sound signal broadcasted on the radio or the like, and a sound signal obtained by a microphone and then digitalized, wherein the microphone is different from the microphone 63 of the head-mount type display device 100b. The image processing section 160 extracts an object, which is included in the external sight image (moving image) continuously taken by the camera 61, as a candidate of the target sound source using the facial recognition. Using a pattern matching process, the image determination section 142 determines a change in motion of the same specific object as a specific object having been stored in advance in the storage section 120 with respect to the candidate of the target sound source thus extracted. For example, in the case in which the teacher TE is extracted as a candidate of the target sound source, the image determination section 142 performs the pattern matching process on a mouth portion as a part of the body of the teacher TE to determine an open-close state of the mouth of the teacher TE. It should be noted that the wireless communication section 132 corresponds to a communication section in the appended claims. The external sight image (moving image) continuously taken by the camera 61 corresponds to images of the external sight at a plurality of time points obtained by an image acquisition section in the appended claims. Separately from the external sight image taken by the camera 61, the user can visually recognize the external sight transmitted through the light guide plates 261, 262 of the image display section 20 and the display image displayed in the maximum image display area PN.

Figure 14:
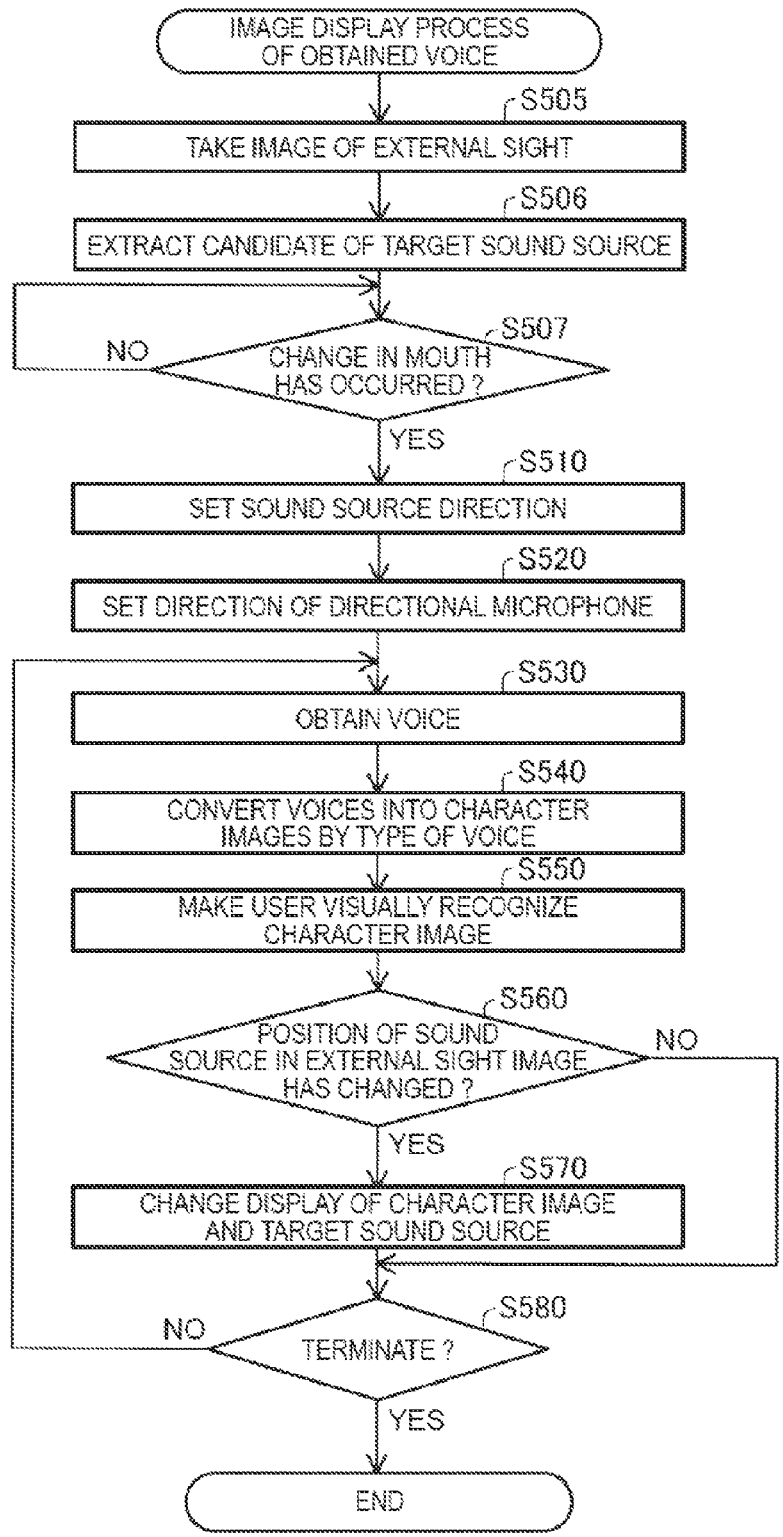
FIG. 14 is an explanatory diagram showing the flow of an image display process of an obtained voice in the third embodiment.

FIG. 14 is an explanatory diagram showing the flow of an image display process of an obtained voice in the third embodiment. The image display process of the obtained voice in the third embodiment is different from the image display process of the obtained voice in the first embodiment in the point that the open-close state of the mouth of the teacher TE is detected to set the sound source direction, and the voice different from the voice obtained by the camera 61 is converted into the character image of a different type.

Figure 15:
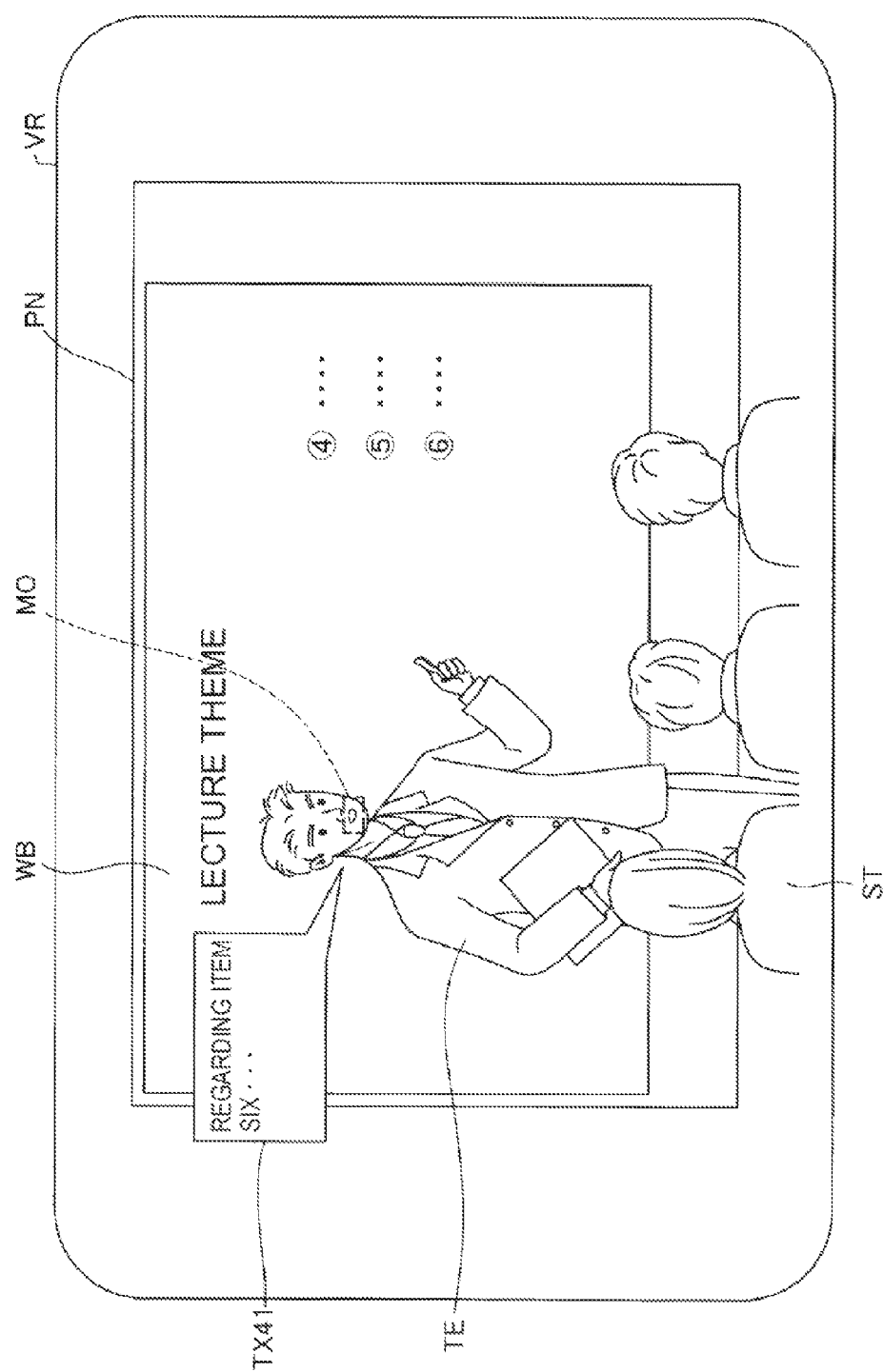
FIG. 15 is an explanatory diagram showing an example of the visual field VR of the user.

In the image display process of the obtained voice in the third embodiment, firstly, when the external sight is imaged (step S505) by the camera 61, the image processing section 160 extracts (step S506) the teacher TE as the candidate of the target sound source. FIG. 15 is an explanatory diagram showing an example of the visual field VR of the user. As shown in FIG. 15, when the teacher TE is extracted as the candidate of the target sound source, then the image determination section 142 further extracts the peripheral part MO of the mouth (hereinafter also referred to simply as a "mouth MO") of the teacher TE using the pattern matching process, and then determines (step S507 in FIG. 14) whether or not the change in the open-close state occurs in the mouth MO. In the case in which it is determined that no change in the open-close state occurs in the mouth MO of the teacher TE (NO in the step S507), the image determination section 142 continuously monitors (step S507) the detection of the change in the open-close state of the mouth MO while keeping the state of extracting the mouth MO of the teacher TE. In the case in which it is determined that the change in the open-close state occurs in the mouth MO of the teacher TE (YES in the step S507), the storage section 120 stores the mouth MO of the teacher TE as the target sound source even if the operation section 135 is not operated, and then sets (step S510) the sound source direction.

When the sound source direction is set, the microphone drive section 163 sets (step S520) the direction of the microphone 63, and then the microphone 63 and the wireless communication section 132 obtain (step S530) the voice and the sound signal representing the voice. In the third embodiment, the sound signal of the Internet radio, which has been obtained by the wireless communication section 132 using the communication, is obtained. Subsequently, the conversion section 185 converts (step S540) the voice obtained by the microphone 63 and the sound signal obtained by the wireless communication section 132 into character images of respective fonts different in type from each other.

Figure 16:
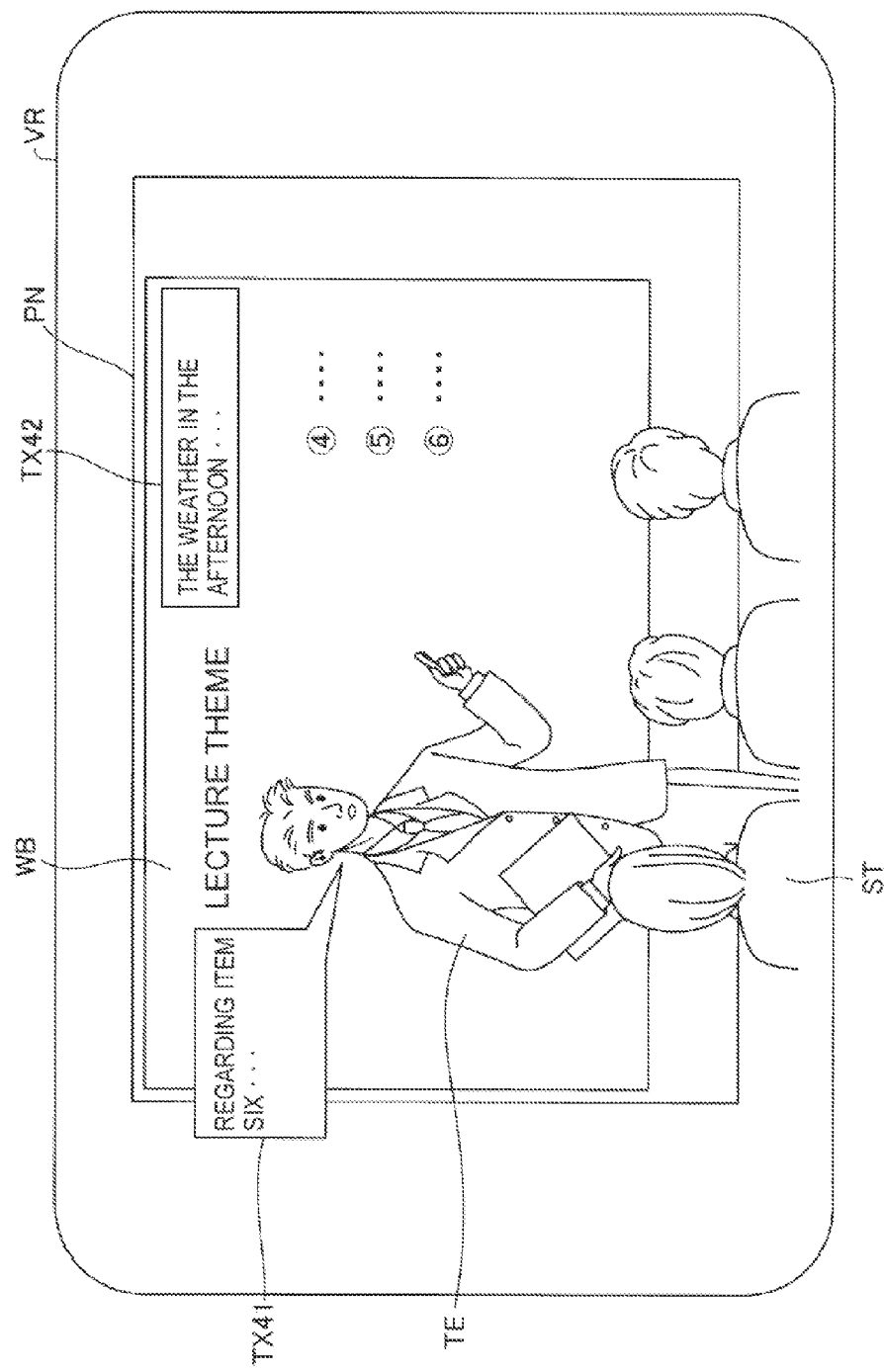
FIG. 16 is an explanatory diagram showing an example of the visual field VR of the user.

When the voice and the sound signal are converted into the character images, the image processing section 160 and the image display section 20 allow (step S550) the user to visually recognize the character images, which are converted and different in type from each other. FIG. 16 is an explanatory diagram showing an example of the visual field VR of the user. As shown in FIG. 16, in the maximum image display area PN, the voice obtained by the microphone 63 is displayed as a text image TX41, and the sound signal obtained by the wireless communication section 132 is displayed as a text image TX42. The font of the text image TX41 is MS Gothic, and the font of the text image TX42 is MS Mincho. It should be noted that in another embodiment, it is also possible to display the text image TX41 and so on with a different font in the maximum image display area PN, or it is also possible to display the text image TX41 and so on with modified factors other than the font for forming the character image, such as bold writing or microscopic writing, or the size of the character.

After allowing the user to visually recognize the character images (step S550 in FIG. 14), the image determination section 142 monitors (step S560) change in the position of the target sound source in the external sight image. Since the camera 61 continues to take the external sight image, the image determination section 142 can identify the position of the mouth of the teacher TE as the target sound source in the external sight image at a plurality of time points. In the case in which it is determined that the position of the mouth of the teacher TE in the external sight image has changed (YES in the step S560), namely in the case in which, for example, the position of the mouth MO of the teacher TE has changed from the position in the visual field VR shown in FIG. 16 to the position in the visual field VR shown in FIG. 6, the image processing section 160 and the image display section 20 change (step S570 in FIG. 14) the position where the character image is displayed in the maximum image display area PN. The image processing section 160 and the image display section 20 display the character image using character image light in the vicinity of the mouth MO of the teacher TE changed in position in the maximum image display area PN. In the case in which the display position of the character image using the character image light has been changed (step S570), or the case in which it has been determined in the process of the step S560 that the position of the target sound source in the external sight image has not changed (NO in the step S560), whether or not the image display process of the obtained voice is to be terminated is determined (step S580).

As explained hereinabove, in the head-mount type display device 100b according to the third embodiment, the camera 61 continues to take the external sight image, and in the case in which it is determined that the position of the mouth MO of the teacher TE in the external sight image has changed, the image processing section 160 and the image display section 20 changes the position where the character image is displayed in the maximum image display area PN. Therefore, in the head-mount type display device 100b according to the third embodiment, since the sound source direction is recognized by the user in a more detailed manner, and the position where the character image is displayed is set in the vicinity of the sound source direction, it is easy to make the user visually recognize the sound source direction and the character image representing the voice let out by the target sound source so as to more strongly be associated with each other.

Further, in the head-mount type display device 100b according to the third embodiment, the sound processing section 170b obtains the sound signal, which is different from the voice obtained by the microphone 63, and is obtained by the wireless communication section 132. The conversion section 185 converts the voice obtained by the microphone 63 and the sound signal obtained by the wireless communication section 132 into character images of respective fonts different in type from each other. Therefore, in the head-mount type display device 100b according to the third embodiment, since the text image TX41 representing the voice obtained by the microphone 63 and the text image TX42 representing the voice obtained by a device other than the microphone 63 are displayed as the character images different in type from each other, it is possible to allow the user to visually recognize the difference between the sound source letting out the voices. Further, in the head-mount type display device 100b, the voice different from the voice obtained by the microphone 63 is the voice representing the sound signal obtained by the wireless communication section 132 using the communication. Therefore, in the head-mount type display device 100b, the user can hear not only the external voice obtained by the microphone 63, but also the voices representing a variety of sound signals obtained using the communication, and at the same time, recognize the voices, which are obtained with the communication, as the visual information.

C. Modified Examples

It should be noted that the invention is not limited to the embodiments described above, but can be implemented in various forms within the scope or the spirit of the invention, and the following modifications, for example, are also possible.

C1. Modified Example 1

In the embodiment described above, in the head-mount type display device 100, there is adopted the configuration in which the conversion section 185 converts the voice obtained into the character image in real time to thereby allow the user to visually recognize the character image. However, the method of allowing the user to visually recognize the character image is not limited thereto, but can variously be modified.

Figure 12:
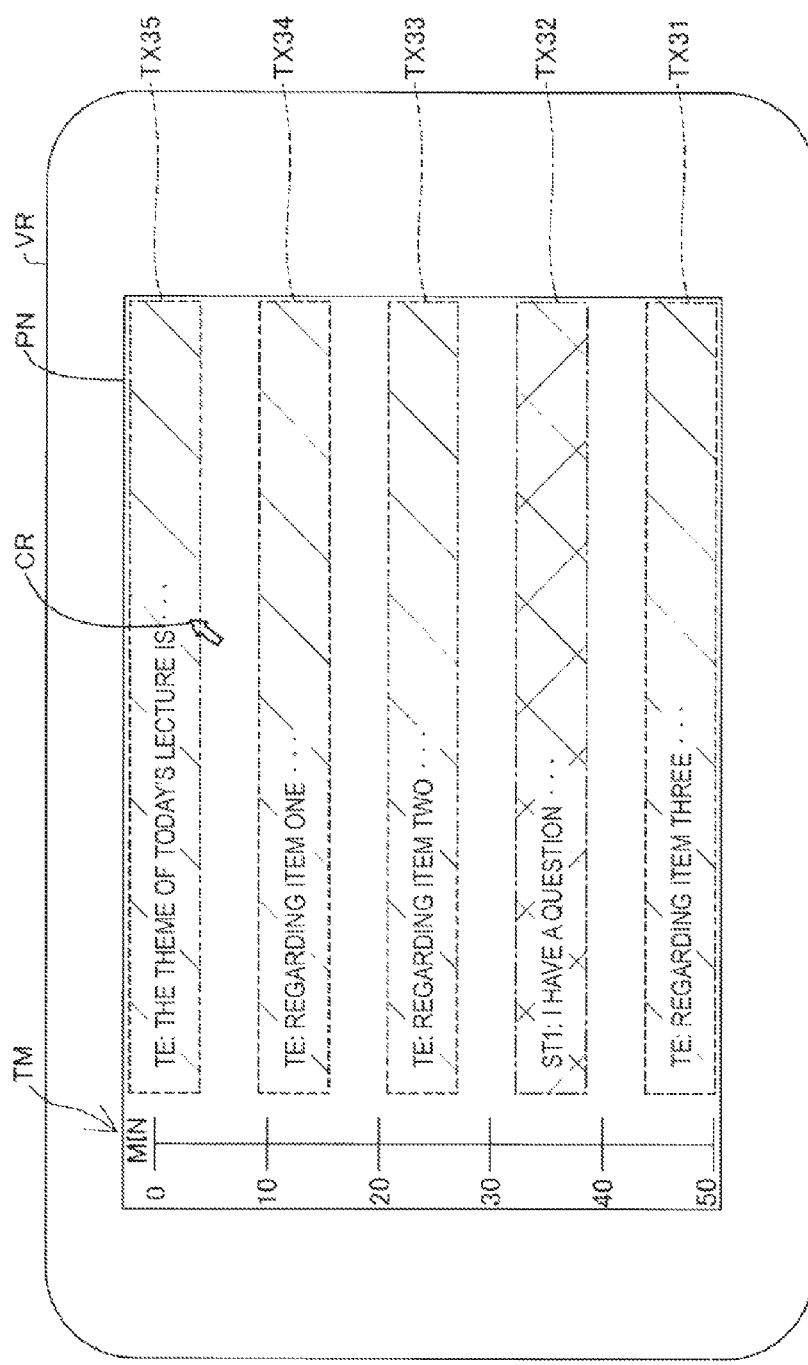
FIG. 12 is an explanatory diagram showing an example of the visual field VR of the user.

FIG. 12 is an explanatory diagram showing an example of the visual field VR of the user. In FIG. 12, the voices stored in the storage section 120 are distributed into the types, and the voices are displayed in the maximum image display area PN as the character images respectively representing the voices so as to be associated with the time when the voice is recorded. As shown in FIG. 12, the elapsed time TM from when the recording of the voices is started is displayed on the left part of the maximum image display area PN. The text image TX35 and so on as the plurality of character images is displayed on the right side of the elapsed time TM in the maximum image display area PN. The text image TX35 and so on are displayed so as to be associated with the time, at which the recording is performed, shown in the elapsed time TM. For example, the text image TX35 is the character image representing the voice, recording of which is started at the beginning of the recording at which the conversion of the voice to the character image is started, and it is understood from the characters in the text image TX35 that the sound source is the teacher TE. Further, the text image TX32 is the character image representing the voice, recording of which is started when roughly 32 minutes has elapsed from the beginning of the recording, and it is understood from the characters in the text image TX32 that the sound source is the student ST1.

When the cursor CR shown in FIG. 12 is made to overlap the text image TX35 and so on to be selected, the character image displayed as the text image TX35 is displayed in the entire area of the maximum image display area PN in an enlarged manner. Further, in accordance with the operation by the user, the image obtained by imaging the sound source direction is displayed in combination with the character image. Therefore, in the head-mount type display device 100, the user can check the character image representing the voice stored in the storage section 120 afterward even in the case of failing to hear the voice or the case of missing the character image. Further, since the storage section 120 also stores the correspondence relationship between the image obtained by imaging the sound source direction and the time recorded, the convenience is enhanced in the case in which, for example, the user searches for the character image representing the voice recorded in the past.

Further, by performing a predetermined operation on the operation section 135 in the case in which the user is hearing the voice, the voice obtained during the period of receiving the predetermined operation can also be displayed as a special character image, or can be stored in the storage section 120 as a special voice. In this head-mount type display device 100, the character image is displayed in the maximum image display area PN in a featured manner, or the voice is stored in a featured manner. Therefore, since the user can add new information to each of the voices or the character images, the convenience of the user is enhanced.

Further, it is also possible for the image display section 20 to make the user visually recognize the character image with a predetermined delay from the moment when the voice is obtained. For example, it is possible for the image display section 20 to display the voice in the maximum image display area PN with a delay of 30 seconds. In this head-mount type display device 100, in the case in which the user has temporarily failed to hear the voice and has missed the character image representing the voice in real time, the user can visually recognize the character image displayed with a delay from the voice as the character image representing the voice, which the user has failed to hear 30 seconds ago, in combination with the voice the user is hearing at the present moment. Therefore, it is easy for the user to understand the context of the voices obtained.

C2. Modified Example 2

Although in the embodiment described above, the position of the character image to be displayed is set in the maximum image display area PN in accordance with the difference between the eye direction of the user thus estimated and the sound source direction, the setting method of the position of the character image to be displayed is not limited thereto, but can variously be modified. For example, the position and the way of the character image to be displayed in the maximum image display area PN can also be set based only on the eye direction of the user thus estimated.

The direction determination section 161 and the nine-axis sensor 66 detect the motion of the image display section 20 to thereby estimate at least one of the variation in the angle and the angular velocity of the eye direction taking the display state, in which the character image representing the voice obtained is displayed in the maximum image display area PN, as a reference. It should be noted that the variation of the angle and the angular velocity of the eye direction each correspond to a specific value in the appended claims. Further, since the nine-axis sensor 66 is capable of detecting the geomagnetism, the nine-axis sensor 66 identifies the direction of gravitational force, and the horizontal direction perpendicular to the direction of gravitational force, and the direction determination section 161 and the nine-axis sensor 66 are capable of estimating the variation of the angle and the angular velocity with respect to the direction of gravitational force and the horizontal direction. In the head-mount type display device 100 according to this modified example, in the case in which the variation in the angle of the eye direction is equal to or greater than 30 degrees, or the case in which the angular velocity is equal to or greater than 1 (radian per second), the direction determination section 161 determines that the user prefers to visually recognize the external sight rather than the character image displayed in the maximum image display area PN. In this case, the image processing section 160 and the image display section 20 change the position, where the character image is to be displayed, toward a direction opposite to the direction of the translation of the line of sight of the user, in apart other than the central part in the maximum image display area PN. For example, in the case in which the eye direction of the user changes upward with respect to the direction of gravitational force, it can be estimated that the user prefers to visually recognize the upper external sight, and therefore, the character image is displayed in the lower part of the maximum image display area PN. Therefore, in the head-mount type display device 100 according to this modified example, since the position where the character image is to be displayed is automatically changed to the position, where the character image does not hinder the visual field of the user, in accordance with the direction, which the user prefers to visually recognize, usability for the user is improved. It should be noted that the angle of 30 degrees corresponds to a third threshold value in the appended claims, and the value of 1 (radian per second) corresponds to a fifth threshold value in the appended claims. It should be noted that in another embodiment, the variation in the angle can be set to a numerical value other than 30 degrees, and the angular velocity can be set to a numerical value other than 1 (radian per second) as the threshold values.

Further, in the head-mount type display device 100 according to this modified example, in the case in which the variation in the angle of the eye direction is smaller than 30 degrees, the angular velocity of the eye direction is lower than 1 (radian per second) with reference to the display state, and 30 seconds has elapsed in that state, the direction determination section 161 determines that the user gives an eye to the character image displayed in the maximum image display area PN. In this case, the image processing section 160 and the image display section 20 display the character image in the central part of the maximum image display area PN. Therefore, in the head-mount type display device 100 according to this modified example, since the character image is automatically displayed in a position easy for the user to visually recognize in the case in which it is determined that the user gives an eye to the character image, usability for the user is improved. It should be noted that the angle of 30 degrees corresponds to a fourth threshold value in the appended claims, and the value of 1 (radian per second) corresponds to a sixth threshold value in the appended claims.

C3. Modified Example 3

Although in the embodiment described above, the sound source direction where the target sound source exists is set as the specific direction, the specific direction is not necessarily required to be the sound source direction, but the specific direction to be set can variously be modified. For example, in the case in which a bus tour guide as the sound source gives an explanation of a landmark such as Tokyo Skytree, it is also possible to set the direction of Tokyo Skytree to be visually recognized in the visual field VR of the user as the specific direction instead of the sound source direction. In this case, the user can visually recognize the character image while always visually recognizing the Tokyo Skytree as the specific direction different from the sound source direction. In the head-mount type display device 100 according to this modified example, since the user can freely set the specific direction, which the user prefers to visually recognize, usability for the user is improved.

Further, as the specific direction, there can also be cited the eye direction visually recognized by the user, the rear direction of the user, and a traveling direction of a vehicle. For example, in the case in which the specific direction is the rear direction the user, it is also possible to change the configuration of the character image to be displayed to thereby make the user recognize the fact that the character image represents the voice obtained in the rear direction.

Further, although in the embodiment described above, the voice obtained from a human is cited as an example of the sound, the sound obtained and then converted is not limited to a voice, but can variously be modified. There can also be cited a cry of an animal as a creature other than human, a warning tone such as a siren sound, and a sound effect. For example, in the case in which the user is surrounded by a lot of people, and hear the voices of the people, since the sound processing section 170 recognizes only the warning tone and then makes the user visually recognize the character image representing the warning tone to thereby make it possible to promptly notice the user of the warning, usability for the user is improved.

Further, although in the embodiment described above, the eye direction of the user is estimated by the nine-axis sensor 66 installed in the image display section 20, the method of estimating the eye direction of the user is not limited to this configuration, but can variously be modified. For example, it is also possible to estimate the eye direction of the user by taking an image of the eyes of the user with a CCD camera to thereby estimate the eye direction of the user, and then analyzing the image thus taken.

Further, although in the embodiment described above, there is adopted the configuration in which the character image is displayed at the position in the vicinity of the sound source direction and other than the central part in the maximum image display area PN, the position and way of displaying the character image are not limited to this configuration, but can variously be modified. For example, if the character image is more important compared to the external sight to be visually recognized by the user, it is also possible to display the character image in the central part of the maximum image display area PN. Further, in the case in which the target sound source is visually recognized in the corner of the visual field VR of the user, and it is required to display the largest possible number of characters in the maximum image display area PN, it is also possible to display the character image in the entire part of the maximum image display area PN not overlapping the sound source direction. Further, in order to improve the visibility of the external sight in the visual field VR of the user, it is also possible to display the sound source direction and the character image so as to overlap each other.

C4. Modified Example 4

Although in the embodiment described above, there is adopted the configuration in which the microphone 63 moves relatively to the image display section 20 to change the direction to thereby vary the sensitivity of obtaining the voice in accordance with the direction from the microphone 63 toward the sound source, it is not necessarily required to move relatively to the image display section 20, but the structure and the configuration of the microphone 63 can variously be modified. For example, the microphone 63b according to the modified example can be formed of a plurality of directional microphones pointed differently from each other. In this case, by stopping obtaining the voices from some of the plurality of microphones in accordance with the operation by the user, the sensitivity of the microphone in obtaining the voice can be made different between the directions. In this head-mount type display device 100, since the structure of relatively moving the microphone 63b with respect to the image display section 20 is unnecessary, the directivity of the microphone 63b in obtaining the voice is set with a simple and convenient configuration.

C5. Modified Example 5

Although in the embodiment described above, there is adopted the configuration in which the image of the sound source direction taken by the camera 61 is displayed in the maximum image display area PN, and the character image is displayed in the vicinity of the image of the sound source direction in the case in which the angle formed between the eye direction and the sound source direction is equal to or larger than 30 degrees, the configuration in which the way and the position of displaying the character image are changed in accordance with the relationship between the eye direction and the sound source direction can variously be modified. For example, it is also possible to adopt a configuration in which the character image is always displayed at a predetermined position in the maximum image display area PN irrespective of the angle formed between the eye direction and the sound source direction. Further, it is also possible to set an angle larger or smaller than 30 degrees as the threshold value instead of setting the position where the character image is to be displayed in the maximum image display area PN taking 30 degrees as the threshold value of the angle formed between the eye direction and the sound source direction.

C6. Modified Example 6

Although in the embodiment described above, the image processing section 160 performs the facial recognition on the image of the external sight taken by the camera 61 to thereby extract the teacher TE as the sound source, the method of extracting the sound source can variously be modified. For example, it is also possible to extract the sound source existing at a predetermined distance from the user as the candidate using a distance measuring sensor.

Further, although in the embodiment described above, the sound processing section 170 identifies the voices different in type from each other using the speaker recognition, the identification method of the voices is not limited to this configuration, but can variously be modified. For example, in the case in which the user listens to the words of the teacher TE as the same sound source every week as in the case of a lecture at a university, by registering the feature of the voice of the teacher TE in advance in the head-mount type display device 100, it is possible to achieve the configuration of preventing other voices than the voice of the teacher TE from being converted into the character image. In this head-mount type display device 100, setting of the voice of each of the types different from the sound source direction in each case is not necessary, and further, the character image representing the voice of the type the user wants to display in the maximum image display area PN as the character image can be identified with high accuracy.

Further, although in the embodiment described above, the voice obtained is converted into the character image representing the voice, the method of converting the voice into the character image can variously be modified. For example, from the viewpoint of privacy protection, it is also possible to adopt a configuration in which the voice obtained is converted into the character image, but recording of the voice obtained is not performed in performances. Further, it is also possible to adopt a configuration in which a specific word such as an individual mane is registered in advance in the head-mount type display device 100 to thereby prevent the word thus registered from being converted into the character image even if the voice is obtained.

Further, as the sound to be registered in advance in the head-mount type display device 100, a sound such as running noise of a machine can also be cited. For example, the character image representing the running noise is made to be visually recognized by the user, and the running noise in a normal operation of an industrial machine is registered in advance. In this case, even in the case in which a factory where the industrial machine is installed is noisy due to other machines and so on, since the user can visually recognize the character image representing the running noise in an abnormal operation of the industrial machine, the user can recognize whether or not the operation state of the industrial machine is normal as the visual information.

C7. Modified Example 7

The configuration of the head-mount type display device 100 in the embodiment described above is illustrative only, and can variously be modified. For example, it is also possible to eliminate one of the direction keys 16 and the track pad 14 provided to the control section 10, or to provide another operating interface such as an operating stick in addition to the direction keys 16 and the track pad 14, or instead of the direction keys 16 and the track pad 14. Further, it is also possible to assume that the control section 10 has a configuration in which an input device such as a keyboard or a mouse is connected to the control section 10, and receives an input from the keyboard or the mouse.

Further, it is also possible to adopt an image display section of another system such as an image display section to be worn like a hat as the image display section instead of the image display section 20 to be worn like a pair of glasses. Further, the earphones 32, 34 and the camera 61 can arbitrarily be omitted. Further, although in the embodiment described above, the LCD and the light source are used as the configuration for generating the image light, it is also possible to adopt other display elements such as an organic EL display instead of the LCD and the light source. Further, although in the embodiment described above, the nine-axis sensor 66 is used as the sensor for detecting the motion of the head of the user, it is also possible to assume that a sensor including one or two of an acceleration sensor, an angular velocity sensor, and a geomagnetic sensor is used instead of the nine-axis sensor 66. Further, although in the embodiment described above, it is assumed that the head-mount type display device 100 is of the binocular transmissive type, the invention can also be similarly applied to other types of head-mount type display devices such as a video transmissive type or a monocular type.

Further, in the embodiment described above, it is also possible to assume that the head-mount type display device 100 guides the image lights representing the same image to the right and left eyes of the user to thereby make the user visually recognize a two-dimensional image, or to assume that the head-mount type display device 100 guides the image lights representing respective images different from each other to the right and left eyes of the user to thereby make the user visually recognize a three-dimensional image.

Further, in the embodiment described above, it is also possible to replace a part of the configuration realized by hardware with software, or by contraries, to replace apart of the configuration realized by software with hardware. For example, although in the embodiment described above, it is assumed that the image processing section 160 and the sound processing section 170 are realized by the CPU 140 retrieving and then executing the computer program, it is also possible to assume that these functional sections are realized by hardware circuits.

Further, in the case in which a part or the whole of the function of the invention is implemented by software, the software (the computer program) can be provided in a configuration of being stored in a computer-readable recording medium. In the invention, the "computer-readable recording medium" is not limited to a portable recording medium such as a flexible disk or a CD-ROM, but includes an internal storage device in the computer such as a variety of types of RAM or ROM, and an external storage device fixed to the computer such as a hard disk.

Further, although in the embodiment described above, the control section 10 and the image display section 20 are formed as separate constituents as shown in FIGS. 1 and 2, the configuration of the control section 10 and the image display section 20 is not limited to this configuration, but can variously be modified. For example, the configuration formed in the control section 10 can be formed inside the image display section 20 in whole or in part. Further, among the constituents formed in the control section 10, only the operation section 135 is formed as a user interface (UI), or the power supply 130 in the embodiment described above is formed alone as a replaceable constituent. Further, the constituents formed in the control section 10 can also be formed in the image display section 20 in an overlapping manner. For example, the CPU 140 shown in FIG. 2 can also be provided to both of the control section 10 and the image display section 20, and it is also possible to adopt a configuration in which the functions respectively performed by the CPU 140 provided to the control section 10 and the CPU provided to the image display section 20 are separated from each other.

C8. Modified Example 8

For example, it is also possible for the image light generation section to have a configuration including an organic EL (organic electroluminescence) display and an organic EL control section. Further, the image generation section, for example, can also use a LCOS (Liquid Crystal On Silicon; LCoS is a registered trademark), a digital micromirror device, and so on instead of the LCD. Further, for example, it is also possible to apply the invention to a laser retinal projection head mounted display. In the case of the laser retinal projection type, an "area to which the image light can be emitted in the image light generation section" can be defined as an image area recognized by the eyes of the user.

Further, for example, the head mounted display can also be formed as a head mounted display having a configuration in which each of the optical image display sections covers only a part of the eye of the user, in other words, a configuration in which each of the optical image display sections does not completely cover the eye of the user. Further, the head mounted display can also be formed as a so-called monocular head mounted display.

Further, as the earphones, an ear hook type or a headband type can be adopted, or the earphones can be eliminated. Further, it is also possible to adopt a configuration as the head mounted display installed in a mobile object such as a vehicle or a plane. Further, it is also possible to adopt a configuration as the head mounted display incorporated in a body protector such as a helmet.

C9. Modified Example 9

Further, although in the embodiment described above, the head-mount type display device 100 to be mounted on the head of the user is used as the display device for making the user visually recognize the character image, the display device is not limited to this device, but can variously be modified. For example, a head-up display (HUD) used in a front glass of a vehicle can also be adopted. In this case, a driver of the vehicle as the user can visually recognize the sound or the like outside the vehicle as the character image while ensuring the visual field in the traveling direction. In the display device according to this modified example, in the case in which a hearing-impaired person drives the vehicle, or the case in which the inside of the vehicle is noisy, since the sound outside the vehicle can be recognized as the visual information, it is possible to recognize an external risk information as the visual information to thereby improve the safety in driving the vehicle.

C10. Modified Example 10

Further, although in the third embodiment described above, in the case in which it is determined that no change in the open-close state occurs in the mouth MO of the teacher TE (NO in the step S507) in the process of the step S507 shown in FIG. 14, the image determination section 142 continuously monitors the detection of the change in the open-close state of the mouth MO of the teacher TE, the image determination section 142 is not required to monitor the detection of the change. For example, in the case in which the change in the open-close state of the mouth MO of the teacher TE is not detected, it is also possible to set the sound source direction taking the teacher TE extracted by the image processing section 160 as the target sound source. Further, in this case, after the change in the open-close state of the mouth MO of the teacher TE is detected for the first time, it is also possible to set the sound source direction taking the mouth MO of the teacher TE as the target sound source.

Further, although in the third embodiment described above, there is cited the voice representing the sound signal obtained by the wireless communication section 132 using the communication as an example of the voice different from the voice obtained by the microphone 63, the voice different from the voice obtained by the microphone 63 is not limited to this example, but can variously be modified. For example, as the voice different from the voice obtained by the microphone 63, a voice obtained by a pin microphone attached to the chest of the teacher TE separately from the microphone 63 can also be adopted. Further, by distinguishing the voice let out by a human and the sound generated by a machine or the like from each other among the voices obtained by the microphone 63 using the sound processing section 170, the fonts of the character images obtained by converting these sounds can also be made different from each other. Further, one of the plurality of voices different from each other can only be converted into the character image, or the number of types of the plurality of voices can also be three or more.

C11. Modified Example 11

Although in the embodiment described above, the sound source direction from the microphone 63 is set based on the external sight image or the eye direction of the user, the setting method of the sound source direction is not limited to this method, but can variously be modified. For example, it is also possible that the levels (e.g., decibel values (dB)) of the volumes of the sounds in the respective directions of a plurality of directional microphones are compared to each other in the plurality of directional microphones, and the direction with the highest sound volume level is set as the sound source direction. In the head-mount type display device 100 according to this modified example, since the user is made to visually recognize the character image representing the sound with the highest sound volume level, it is possible to make the user recognize the external sound, which the user should pay the greatest attention to, as the visual information even in the case in which it is difficult for the user to hear the external sound due to, for example, headphones.

Further, although in the embodiment described above, the position where the character image is to be displayed is set in accordance with the difference between the eye direction and the sound source direction thus set, the setting method of the position where the character image is to be displayed is not limited to this method, but can variously be modified. For example, in this modified example, a microphone 63c has the highest sensitivity to a sound obtained from an A direction and a sound obtained from a B direction. In the case in which the volume level of the sound obtained by the microphone 63c is the same between the A direction and the B direction at a certain moment, and subsequently, the volume level of the sound obtained from the A direction is higher than the volume level of the sound obtained from the B direction, the direction determination section 161 determines that the target sound source has moved from the B direction toward the A direction. Subsequently, the image processing section 160 and the image display section 20 display the character image obtained by converting the sound obtained by the microphone 63c in the vicinity of the A direction in the maximum image display area PN. In this modified example, the microphone 63c has the sensitivity to the volume of the sound to be obtained different between the directions, and the image processing section 160 and the image display section 20 change the position where the character image is displayed based on the volume level of the sound thus obtained. Therefore, in this modified example, since it is possible to set the sound source direction and to display the character image in the vicinity of the target sound source without the camera 61 or the like, convenience for the user is enhanced.

Further, the sound source direction can also be set using a global positioning system (GPS). For example, in the case in which the target sound source such as the teacher TE, which lets out the voice necessary to obtain, has been identified in advance, by making the target sound source and the image display section 20 respectively incorporate GPS modules, and receiving the position information of the GPS modules by the wireless communication section 132, it is also possible to identify the positional relationship between the image display section 20 and the teacher TE bringing the GPS module with it. In this modified example, it is possible to identify more detailed sound source direction than in the case of identifying the sound source direction using the external sight image by the camera 61 or the directional microphone 63 and so on. It should be noted that the method of identifying the sound source direction with respect to the image display section 20 is not limited to one using the GPS modules, but can variously be modified. For example, it is also possible to make the teacher TE bring a communication device with it, the communication device corresponding one-to-one to the head-mount type display device 100.

Further, it is also possible that the distance from the image display section 20 to the target sound source is identified by the GPS modules and so on performing the triangulation using a satellite, and then the size of the character image to be displayed in the maximum image display area PN is set based on the distance thus identified. For example, it is also possible that the shorter the distance from the image display section 20 to the target sound source is, the larger the size of the character image, which represents the sound obtained by the microphone 63c, and is displayed in the maximum image display area PN, becomes. In this modified example, since the size of the character image varies in accordance with the distance from the user to the target sound source, it is possible to make the user recognize the distance to the target sound source as the visual information. It should be noted that the distance from the image display section 20 to the target sound source is categorized into several stages, and the size of the character image to be displayed in the maximum image display area PN can also be varied in accordance with the category in a stepwise manner. In this case, in the case in which the distance exceeds a predetermined value, it is also possible to change the position where the character image is displayed in the maximum image display area PN to a position shifted from the center of the maximum image display area PN to display the character image at that position to thereby improve the visibility of the user. Further, it is also possible to change the type of the character image instead of the size of the character image, or it is also possible to change both of the size and the type of the character image. It should be noted that it is also possible to identify the sound source direction using the camera 61 and so on, and to identify only the distance from the image display section 20 to the target sound source using the GPS modules and so on. The GPS modules and the wireless communication section 132 correspond to a distance identification section in the appended claims.

Further, the method of identifying the distance from the image display section 20 to the target sound source can variously be modified. As the method of identifying the distance from the image display section 20 to the target sound source, it is also possible to use an optical double image coincidence type range finder, or an ultrasonic range finder instead of using the GPS modules. Further, it is also possible that the image display section 20 is provided with a plurality of cameras 61 disposed at respective locations different from each other, and the distance from the image display section 20 to the target sound source is identified based on each of the images respectively taken by the cameras 61 disposed at respective locations different from each other. Further, it is also possible that the distance from the image display section 20 to the target sound source is identified by irradiating the target sound source with light, and receiving the reflected light using the light receiving element and then evaluating the reflected light. Further, it is also possible to identify the distance based on the intensity of the radio waves of the wireless LAN.

Figure 17A:
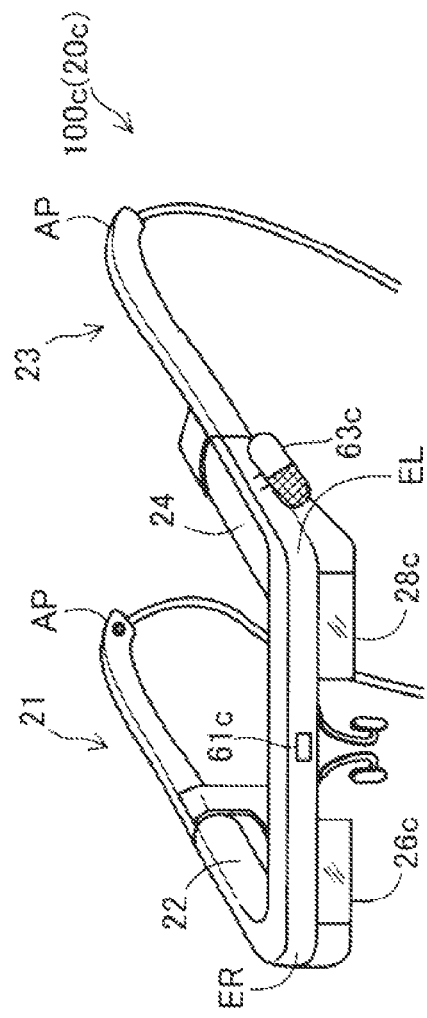
FIGS. 17A and 17B are explanatory diagrams showing an exterior configuration of a head-mount type display device according to a modified example.
Figure 17B:
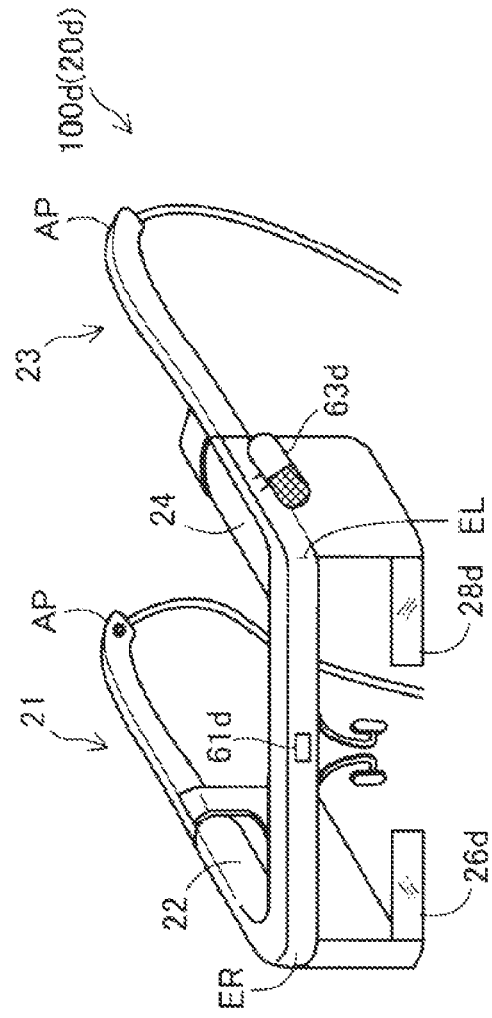

FIGS. 17A and 17B are explanatory diagrams showing an exterior configuration of a head-mount type display device according to a modified example. In the case of the example shown in FIG. 17A, the difference from the head-mount type display device 100 shown in FIG. 1 is the point that the image display section 20c is provided with a right optical image display section 26c instead of the right optical image display section 26, and the point that the left optical image display section 28c is provided instead of the left optical image display section 28. The right optical image display section 26c is formed to be smaller than the optical member of the embodiment described above, and is disposed obliquely above the right eye of the user US when wearing the head-mount type display device 100c. Similarly, the left optical image display section 28c is formed to be smaller than the optical member of the embodiment described above, and is disposed obliquely above the left eye of the user US when wearing the head-mount type display device 100c. In the case of the example shown in FIG. 17B, the difference from the head-mount type display device 100 shown in FIG. 1 is the point that the image display section 20d is provided with a right optical image display section 26d instead of the right optical image display section 26, and the point that the left optical image display section 28d is provided instead of the left optical image display section 28. The right optical image display section 26d is formed to be smaller than the optical member of the embodiment described above, and is disposed obliquely below the right eye of the user US when wearing the head mounted display.

The left optical image display section 28d is formed to be smaller than the optical member of the embodiment described above, and is disposed obliquely below the left eye of the user US when wearing the head mounted display. As described above, it is sufficient for the optical image display sections to be disposed in the vicinity of the eye of the user US. Further, the size of the optical member forming the optical image display sections is determined arbitrarily, and it is possible to realize the head-mount type display device 100 having a configuration in which the optical image display sections each cover only a part of the eye of the user US, in other words, the configuration in which the optical image display sections each do not completely cover the eye of the user US.

The invention is not limited to the embodiments and the modified examples described above, but can be realized with a variety of configurations within the scope or the spirit of the invention. For example, the technical features in the embodiments and the modified examples corresponding to the technical features in the aspects described in SUMMARY section can arbitrarily be replaced or combined in order to solve all or apart of the problems described above, or in order to achieve all or a part of the advantages. Further, the technical feature can arbitrarily be eliminated unless described in the specification as an essential element.

The entire disclosure of Japanese Patent Application Nos. 2012-275338, filed Dec. 18, 2012 and 2013-208872, filed Oct. 4, 2013 are expressly incorporated by reference herein.

What is claimed is:
1. A transmissive display device comprising:
an image display section adapted to generate image light representing an image, allow a user to visually recognize the image light in a state of being worn on a head of the user, and transmit an external sight;
a sound acquisition section adapted to obtain a sound;
a conversion section adapted to convert the sound into a character image expressing the sound as an image using characters;
a specific direction setting section adapted to set a specific direction, the specific direction being a direction from the sound acquisition section to a sound source;
an eye direction estimation section adapted to estimate an eye direction of the user; and
a display position setting section adapted to set an image display position, which is a position where character image light representing the character image is allowed to be visually recognized in a visual field of the user, based on the specific direction,
wherein the display position setting section
sets the image display position based on a relationship between the specific direction and the eye direction,
sets the image display position to a vicinity of the position corresponding to the specific direction in the visual field of the user in a case in which a specific angle, which is an angle formed between the eye direction and the specific direction, is smaller than a first threshold value, and
sets the image display position independently of the specific direction in a case in which the specific angle is equal to or larger than the first threshold value.
2. The display device according to claim 1, wherein
the display position setting section sets the image display position so as not to overlap a position corresponding to the specific direction in the visual field of the user.

3. The display device according to claim 1, wherein
the display position setting section sets the image display position to a position corresponding to a part other than a center in the visual field of the user.

4. The display device according to claim 1, wherein
the sound acquisition section has sensitivity of obtaining a sound, the sensitivity varying with a direction from the sound source to the sound acquisition section, and
the specific direction is set based on the sensitivity to the sound obtained.

5. The display device according to claim 1, further comprising:
an image acquisition section adapted to obtain an image of the external sight at a plurality of time points,
wherein the image display position setting section sets the image display position based on a variation in the image of the external sight at the plurality of time points and the specific direction.

6. The display device according to claim 1, further comprising:
a distance identification section adapted to identify a distance from the display device to the sound source,
wherein the display position setting section performs at least one of change in size of the character image light and setting of the image display device based on the distance identified.

7. The display device according to claim 1, further comprising:
a distance identification section adapted to identify a distance from the display device to the sound source,
wherein the conversion section changes a type of the character image based on the distance identified.

8. The display device according to claim 1, wherein
the sound acquisition section has sensitivity of obtaining a volume of a sound, the sensitivity varying with a direction from the sound source to the sound acquisition section, and
the display position setting section sets the image display position based on the volumes of the sound generated by the same sound source and differently obtained in respective directions different from each other.

9. The display device according to claim 1, wherein
the sound acquisition section has sensitivity of obtaining a sound, the sensitivity varying with a direction from the sound source to the sound acquisition section, and is configured so that the sensitivity of obtaining the sound from the specific direction becomes the highest.

10. The display device according to claim 1, further comprising:
a sound identification section adapted to distribute the sounds into types of the sounds, the sounds being obtained from a plurality of sound sources, and having the respective types different from each other; and
an operation section adapted to receive an operation by the user,
wherein the specific direction setting section identifies a specific sound source direction, which is a direction from the sound acquisition section to the sound source from which one of the plurality of sounds is obtained based on the operation, and
the display position setting section sets a position, where the character image light representing the one sound is made to be visually recognized, to a vicinity of a position corresponding to the specific sound source direction in a visual field of the user.

11. The display device according to claim 10, wherein
the display position setting section sets a position, where the character image light representing the one sound is made to be visually recognized, to a position failing to overlap any of positions corresponding respectively to the plurality of specific sound source directions in a visual field of the user.

12. The display device according to claim 10, wherein
the image display section converts the plurality of sounds into the character image lights different from each other by the type of the sound, and allows the user to visually recognize the image light of each of the types of the plurality of sounds, and
the operation corresponds to an operation of specifying the character image light corresponding to the sound from the one specific sound source direction from the character image lights of the respective types of the plurality of sounds visually recognized in the visual field of the user.

13. The display device according to claim 1, wherein
the image display section allows the user to recognize the character image light as a virtual image with a predetermined time delay from a time point when the sound acquisition section obtains the sound.

14. The display device according to claim 1, further comprising:
an image acquisition section adapted to obtain an image of the external sight,
wherein the image display section
generates specific direction image light, which is image light representing an image in the specific direction obtained by the image acquisition section, and allows the user to visually recognize the specific direction image light in a case in which a specific angle, which is an angle formed between the eye direction and the specific direction, is one of equal to and larger than a second threshold value, and
stops generating the specific direction image light in a case in which the specific angle is smaller than the second threshold value, and
the display position setting section
sets the position, where the specific direction image light is made to be recognized, in a vicinity of the image display position, and so as to fail to overlap the image display position, in a case in which the specific angle is one of equal to and larger than the second threshold value, and
sets the image display position in a vicinity of a position corresponding to the specific direction in a visual field of the user in a case in which the specific angle is smaller than the second threshold value.

15. The display device according to claim 1, further comprising:
a sound identification section adapted to distinguish the sound obtained and a specific sound different from the sound obtained from each other,
wherein the conversion section converts the sound obtained and the specific sound into the respective character images different in type from each other.

16. The display device according to claim 15, further comprising:
a communication section adapted to obtain a sound signal using communication,
wherein the specific sound is a sound output based on the sound signal obtained by the communication section.

17. The display device according to claim 1, further comprising:
a sound acquisition moving section adapted to change an orientation of the sound acquisition section relative to the image display section,
wherein
the sound acquisition section is mounted to the image display section,
the sound acquisition section has sensitivity of obtaining the sound, the sensitivity varying with a variation of the orientation of the sound acquisition section relative to the sound source, and
the sound acquisition moving section changes the orientation of the sound acquisition section relative to the image display section from a first orientation to a second orientation where the sensitivity of obtaining the sound from the sound source is higher in the second orientation than in the first orientation.

18. A transmissive head-mount type display device comprising:
an image display section adapted to generate image light representing an image, allow a user to visually recognize the image light in a state of being worn on a head of the user, and transmit an external sight;
a sound acquisition section adapted to obtain a sound;
a conversion section adapted to convert the sound into a character image expressing the sound as an image using characters;
an eye direction estimation section adapted to estimate an eye direction of the user; and
a display position setting section adapted to set an image display position, which is a position where character image light representing the character image is allowed to be visually recognized in a visual field of the user, based on a variation in the eye direction,
wherein
the eye direction estimation section estimates a specific value of at least one of an angular velocity and a variation in angle of the eye direction with reference to a display state in which the character image light is recognized by the user, and
the display position setting section sets the image display position at a part other than a central part in the visual field of the user in a case in which the specific value exceeds a predetermined value.

19. The head-mount type display device according to claim 18, wherein
the sound acquisition section has sensitivity of obtaining a volume of a sound, the sensitivity varying with a direction from a sound source to the sound acquisition section, and
the display position setting section sets the image display position based on the volumes of the sound generated by the same sound source and differently obtained in respective directions different from each other.

20. The head-mount type display device according to claim 18, wherein
the eye direction estimation section estimates a direction of gravitational force and a horizontal direction perpendicular to the direction of gravitational force, and
the display position setting section sets the image display position in the visual field of the user based on the specific value in the display state with respect to the direction of gravitational force and the horizontal direction.

21. The head-mount type display device according to claim 18, wherein the display position setting section
sets the image display position to a part other than a central part in the visual field of the user in a case in which the variation in the angle is one of equal to and larger than a third threshold value, and
sets the image display position to a predetermined position in the visual field of the user in a case in which the variation in the angle is smaller than the third threshold value.

22. The head-mount type display device according to claim 18, wherein
the display position setting section
sets the image display position to the central part in the visual field of the user in a case in which a predetermined time has elapsed in a state in which the variation in the angle is smaller than a fourth threshold value, and
sets the image display position to a part other than the central part in the visual field of the user in a case in which the variation in the angle is one of equal to and larger than the fourth threshold value.

23. The head-mount type display device according to claim 18, wherein
the display position setting section
sets the image display position to a part other than the central part in the visual field of the user in a case in which the angular velocity is one of equal to and higher than a fifth threshold value, and
sets the image display position to a predetermined position in the visual field of the user in a case in which the angular velocity is lower than the fifth threshold value.

24. The head-mount type display device according to claim 18, wherein
the display position setting section
sets the image display position to the central part in the visual field of the user in a case in which a predetermined time has elapsed in a state in which the angular velocity is lower than a sixth threshold value, and
sets the image display position to a part other than the central part in the visual field of the user in a case in which the angular velocity is one of equal to and higher than the sixth threshold value.

25. The display device according to claim 18, further comprising:
a sound acquisition moving section adapted to change an orientation of the sound acquisition section relative to the image display section,
wherein
the sound acquisition section is mounted to the image display section,
the sound acquisition section has sensitivity of obtaining the sound, the sensitivity varying with a variation of the orientation of the sound acquisition section relative to a sound source, and
the sound acquisition moving section changes the orientation of the sound acquisition section relative to the image display section from a first orientation to a second orientation where the sensitivity of obtaining the sound from the sound source is higher in the second orientation than in the first orientation.

26. A method of controlling a transmissive display device, comprising:
providing an image display section adapted to generate image light representing an image, allow a user to visually recognize the image light in a state of being worn on a head of the user, and transmit an external sight;
obtaining a sound;
converting the sound into a character image expressing the sound as an image using characters;
generating character image light as image light representing the character image, allowing the user to visually recognize the character image light in the state in which the image display section is worn on the head of the user, and transmitting the external sight;
setting a specific direction, the specific direction being a direction from a sound acquisition section to a sound source;
estimating an eye direction of the user; and
setting a position, where the character image light is allowed to be visually recognized in a visual field of the user, based on the specific direction,
wherein
the position is set based on a relationship between the specific direction and the eye direction,
the position is set to a vicinity corresponding to the specific direction in the visual field of the user in a case in which a specific angle, which is an angle formed between the eye direction and the specific direction, is smaller than a first threshold value, and
the position is set independently of the specific direction in a case in which the specific angle is one of equal to and larger than the first threshold value.

27. The method according to claim 26, further comprising:
changing an orientation of the sound acquisition section relative to the image display section,
wherein
the obtaining of the sound is carried out by the sound acquisition section which is mounted to the image display section;
the sound acquisition section has sensitivity of obtaining the sound, the sensitivity varying with a variation of the orientation of the sound acquisition section relative to the sound source, and
the orientation of the sound acquisition section relative to the image display section is changed from a first orientation to a second orientation where the sensitivity of obtaining the sound from the sound source is higher in the second orientation than in the first orientation.

28. A method of controlling a transmissive head-mount type display device, comprising:
providing an image display section adapted to generate image light representing an image, allow a user to visually recognize the image light in a state of being worn on a head of the user, and transmit an external sight;
obtaining a sound;
converting the sound into a character image expressing the sound as an image using characters;
generating character image light as the image light representing the character image, allowing the user to visually recognize the character image light in the state in which the image display section is worn on the head of the user, and transmitting the external sight;
estimating an eye direction of the user; and
setting a position, where the character image light is allowed to be visually recognized in a visual field of the user, based on the eye direction,
wherein
in the estimating of the eye direction, a specific value is estimated of at least one of an angular velocity and a variation in angle of the eye direction with reference to a display state in which the character image light is recognized by the user, and
the position where the character image light is allowed to be visually recognized in the visual field of the user is set at a part other than a central part in the visual field of the user in a case in which the specific value exceeds a predetermined value.

29. The method according to claim 28, further comprising:
changing an orientation of a sound acquisition section relative to the image display section,
wherein
the obtaining of the sound is carried out by the sound acquisition section which is mounted to the image display section;
the sound acquisition section has sensitivity of obtaining the sound, the sensitivity varying with a variation of the orientation of the sound acquisition section relative to the sound source, and
the orientation of the sound acquisition section relative to the image display section is changed from a first orientation to a second orientation where the sensitivity of obtaining the sound from the sound source is higher in the second orientation than in the first orientation.

30. A transmissive display device comprising:
an image display section adapted to generate image light representing an image, allow a user to visually recognize the image light in a state of being worn on the head of the user, and transmit an external sight;
a sound acquisition section adapted to obtain a sound;
a conversion section adapted to convert the sound into a character image expressing the sound as an image using characters;
a specific direction setting section adapted to set a specific direction, the specific direction being a direction from the sound acquisition section to a sound source;
a display position setting section adapted to set an image display position, which is a position where character image light representing the character image is allowed to be visually recognized in a visual field of the user, based on the specific direction;
an eye direction estimation section adapted to estimate an eye direction of the user; and
an image acquisition section adapted to obtain an image of the external sight,
wherein the image display section
generates specific direction image light, which is image light representing an image in the specific direction obtained by the image acquisition section, and allows the user to visually recognize the specific direction image light in a case in which a specific angle, which is an angle formed between the eye direction and the specific direction, is equal to or larger than a threshold value, and
stops generating the specific direction image light in a case in which the specific angle is smaller than the threshold value, and
wherein the display position setting section
sets the image display position based on a relationship between the specific direction and the eye direction,
sets the position, where the specific direction image light is allowed to be recognized, in a vicinity of the image display position, and so as to fail to overlap the image display position, in a case in which the specific angle is equal to or larger than the threshold value, and sets the image display position in a vicinity of a position corresponding to the specific direction in the visual field of the user in a case in which the specific angle is smaller than the threshold value.

31. The display device according to claim 30, further comprising:

a sound acquisition moving section adapted to change an orientation of the sound acquisition section relative to the image display section, wherein the sound acquisition section is mounted to the image display section, the sound acquisition section has sensitivity of obtaining the sound, the sensitivity varying with a variation of the orientation of the sound acquisition section relative to the sound source, and the sound acquisition moving section changes the orientation of the sound acquisition section relative to the image display section from a first orientation to a second orientation where the sensitivity of obtaining the sound from the sound source is higher in the second orientation than in the first orientation.

* * * * *